United States Patent
Yan et al.

(10) Patent No.: US 11,444,546 B2
(45) Date of Patent: Sep. 13, 2022

(54) POWER SUPPLY DEVICE, CHARGING SYSTEM AND CHARGE SCHEDULING METHOD

(71) Applicant: Delta Electronics (Shanghai) Co., Ltd., Shanghai (CN)

(72) Inventors: Chao Yan, Shanghai (CN); Hongyang Wu, Shanghai (CN); Liping Sun, Shanghai (CN); Jianjun Ni, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 16/851,095

(22) Filed: Apr. 17, 2020

(65) Prior Publication Data

US 2020/0336081 A1    Oct. 22, 2020

(30) Foreign Application Priority Data

Apr. 18, 2019   (CN) .......................... 201910314569.8
Feb. 27, 2020   (CN) .......................... 202010123106.6

(51) Int. Cl.
*H02M 7/217*     (2006.01)
*H02M 1/42*      (2007.01)
(Continued)

(52) U.S. Cl.
CPC ......... *H02M 7/2176* (2013.01); *H02M 1/007* (2021.05); *H02M 1/0043* (2021.05);
(Continued)

(58) Field of Classification Search
CPC .......... H02M 7/02; H02M 7/04; H02M 7/043; H02M 7/06; H02M 7/08; H02M 7/10;
(Continued)

(56) References Cited

U.S. PATENT DOCUMENTS 5,515,264 A * 5/1996 Stacey .................... H02M 7/49
363/132
10,131,239 B2   11/2018 Herke et al.
(Continued)

FOREIGN PATENT DOCUMENTS

CN    101009431 A    8/2007
CN    200947557 Y    9/2007
(Continued)

OTHER PUBLICATIONS

Corresponding China Office Action dated Jul. 15, 2017.
(Continued)

*Primary Examiner* — Gary L Laxton
(74) *Attorney, Agent, or Firm* — CKC & Partners Co., LLC

(57) ABSTRACT

The power supply device includes a first winding, a second winding, a third winding, a fourth winding, a first AC-DC conversion unit, a second AC-DC conversion unit, a first power supply terminal and a second power supply terminal. The first and second windings are disposed on a secondary side of a multi-pulse transformer, and coupled to an input of the first AC-DC conversion unit. The first power supply terminal is coupled to an output of the first AC-DC conversion unit. The third and fourth windings are disposed on the secondary side of the multi-pulse transformer, and coupled to an input of the second AC-DC conversion unit. The second power supply terminal is coupled to an output of the second AC-DC conversion unit. Phases of output voltages of the first winding, the third winding, the second winding and the fourth winding are successively shifted left or successively shifted right for 15°.

17 Claims, 15 Drawing Sheets

(51) Int. Cl.
    *H02M 1/00*    (2006.01)
    *H02M 7/06*    (2006.01)
    *H02M 7/04*    (2006.01)
    *H01F 30/12*   (2006.01)

(52) U.S. Cl.
    CPC ......... *H02M 1/4258* (2013.01); *H02M 7/043* (2013.01); *H02M 7/06* (2013.01); *H01F 30/12* (2013.01)

(58) Field of Classification Search
    CPC ... H02M 1/0043; H02M 1/0067; H02M 1/007
    See application file for complete search history.

(56) References Cited

U.S. PATENT DOCUMENTS

| | | | |
|---|---|---|---|
| 2011/0234020 A1 | 9/2011 | Lai et al. | |
| 2013/0020989 A1 | 1/2013 | Xia et al. | |
| 2014/0369088 A1* | 12/2014 | Yoo ..................... | H02M 5/458 363/37 |
| 2016/0211689 A1 | 7/2016 | Wang et al. | |
| 2017/0077698 A1 | 3/2017 | Liu | |

FOREIGN PATENT DOCUMENTS

| | | | |
|---|---|---|---|
| CN | 101170284 | A | 4/2008 |
| CN | 101286639 | A | 10/2008 |
| CN | 101951008 | A | 1/2011 |
| CN | 101673964 | B | 8/2011 |
| CN | 201956919 | U | 8/2011 |
| CN | 102280881 | A | 12/2011 |
| CN | 202094811 | U | 12/2011 |
| CN | 102545221 | A | 7/2012 |
| CN | 102738810 | A | 10/2012 |
| CN | 103023043 | A | 4/2013 |
| CN | 203166553 | U | 8/2013 |
| CN | 103311924 | A | 9/2013 |
| CN | 203326858 | U | 12/2013 |
| CN | 103683305 | A | 3/2014 |
| CN | 204577931 | U | 8/2015 |
| CN | 204928282 | U | 12/2015 |
| CN | 103532158 | B | 1/2016 |
| CN | 103595063 | B | 3/2016 |
| CN | 205489525 | U | 8/2016 |
| CN | 205509651 | U | 8/2016 |
| CN | 105932893 | A | 9/2016 |
| CN | 105958521 | A | 9/2016 |
| CN | 106230262 | A | 12/2016 |
| CN | 205960661 | U | 2/2017 |
| CN | 107124027 | A | 9/2017 |
| CN | 107394803 | A | 11/2017 |
| CN | 107706797 | A | 2/2018 |
| CN | 207274432 | U | 4/2018 |
| CN | 108011306 | A | 5/2018 |
| CN | 108879738 | A | 11/2018 |
| CN | 208094255 | U | 11/2018 |
| CN | 208299522 | U | 12/2018 |
| CN | 109617044 | A | 4/2019 |
| CN | 109617424 | A | 4/2019 |
| EP | 2907227 | A2 | 8/2015 |
| WO | 2014056668 | A2 | 4/2014 |

OTHER PUBLICATIONS

Corresponding China Office Action dated Aug. 2, 2021.
Corresponding China Office Action dated Apr. 22, 2022.
Corresponding extended European search report dated Jul. 30, 2020.
The Office Action of U.S. Appl. No. 16/851,089 dated Feb. 16, 2022.

* cited by examiner

POWER SUPPLY DEVICE, CHARGING SYSTEM AND CHARGE SCHEDULING METHOD

CROSS-REFERENCE TO RELATED APPLICATION

The present application claims priority to Chinese Patent Application No. 201910314569.8, filed to China National Intellectual Property Administration on Apr. 18, 2019, and Chinese Patent Application No. 202010123106.6, filed to China National Intellectual Property Administration on Feb. 27, 2020, the contents of which are incorporated herein by reference.

TECHNICAL FIELD

The present application relates to the field of power electronics technologies, and in particular, to a power supply device, a charging system and a charge scheduling method.

BACKGROUND

Since the development of social economy and demands for electric power is increasingly growing, it is more important to ensure a purification of power supply network. Harmonic wave is common existing in a current power system, and is a primary indicator of power quality. For example, a charge device for electric automobiles is a kind of non-liner load, which has a large harmonic current during working. The high harmonic current input into the power grid would cause negative influences, such as reduced power quality. Thus, reducing harmonic wave pollution caused by the power supply device is of great significance to improve the power quality and ensure a safe operation of the power system.

In the prior solution, a centralized high-power charging system for an electric automobile includes an isolated transformer and AC-DC (alternating current-direct current) charge modules. The isolated transformer converts voltage of power grid into mains voltage, and then the main voltage is input into the AC-DC charge modules. The AC-DC charge module consists of a power factor correction circuit and an isolated DC-DC (direct current-direct current) converter. The power factor correction circuit of each AC-DC charge module is an independent circuit, which has low harmonic wave pollution, but the power factor correction circuit increases the complexity of electric circuit and controlling, and a plurality of power factor correction circuit have a higher cost.

SUMMARY

The present application provides a power supply device, a charging system and a charge scheduling method, which can restrain grid side harmonic wave and reduce the cost of electric circuits. A first aspect of the present application provides a power supply device which includes: a first winding, a second winding, a third winding, a fourth winding, a first AC-DC conversion unit, a second AC-DC conversion unit, a first power supply terminal and a second power supply terminal.

The first winding and the second winding are disposed on a secondary side of a multi-pulse transformer, and coupled to an input of the first AC-DC conversion unit. The first power supply terminal is coupled to an output of the first AC-DC conversion unit. The third winding and the fourth winding are disposed on the secondary side of the multi-pulse transformer, and coupled to an input of the second AC-DC conversion unit. The second power supply terminal is coupled to an output of the second AC-DC conversion unit. Phases of output voltages of the first winding, the third winding, the second winding and the fourth winding are successively shifted left or successively shifted right for 15°.

A second aspect of the present application provides a charge scheduling method, based on the power supply device according to the first aspect of the present application. The number of the power supply devices is larger than or equal to two. The method includes:

S1, obtaining the number of the first power supply terminals and the number of the second power supply terminals in working state when receiving a charge request from an equipment to be charged;

S2, a power supply terminal with a less number to charge the equipment to be charged, when the number of the first power supply terminals in working state is not equal to the number of the second power supply terminals in working state; and S3, scheduling one of the first power supply terminal and the second power supply terminal to charge the equipment to be charged, when the number of the first power supply terminals in working state is equal to the number of the second power supply terminals in working state.

A third aspect of the present application provides a charging system which includes: a multi-pulse transformer and the power supply device according to the first aspect of the present application. A primary-side winding of the multi-pulse transformer is coupled to a power grid, and secondary-side windings of the multi-pulse transformer includes the first winding, the second winding, the third winding and the fourth winding.

A forth aspect of the present application provides a power supply device which includes: P winding pairs, P AC-DC conversion units, and P power supply terminals. Each of the winding pairs including a first winding and a second winding. Each of the AC-DC conversion units including a first input, a second input and an output. The first input is coupled to the first winding of a corresponding winding pair, and the second input is coupled to the second winding of the corresponding winding pair. Each of the power supply terminals is coupled to the output of a corresponding AC-DC conversion unit. A phase shifting angle between the first winding and the second winding in the same winding pairs is 30°, a phase shifting angle between the first windings in adjacent winding pairs is 360°/12P, a phase shifting angle between the second windings in adjacent winding pairs is 360°/12P, and P is a positive integer larger than or equal to two.

A fifth aspect of the present application provides a charging system, which includes: M power supply devices according to the forth aspect of the present application, and a multi-pulse transformer. M is a positive integer. A primary-side winding of the multi-pulse transformer is coupled to a power grid, and the winding pairs of the M power supply devices are disposed on a secondary side of the multi-pulse transformer.

From the above descriptions, the power supply device achieves multi-pulse rectification, restrains the grid-side harmonic wave and has a low cost.

The above contents of the present invention will become more readily apparent to those ordinarily skilled in the art after reviewing the following detailed description and accompanying drawings, in which:

BRIEF DESCRIPTION OF DRAWING(S)

DESCRIPTION OF EMBODIMENTS

Figure 1:
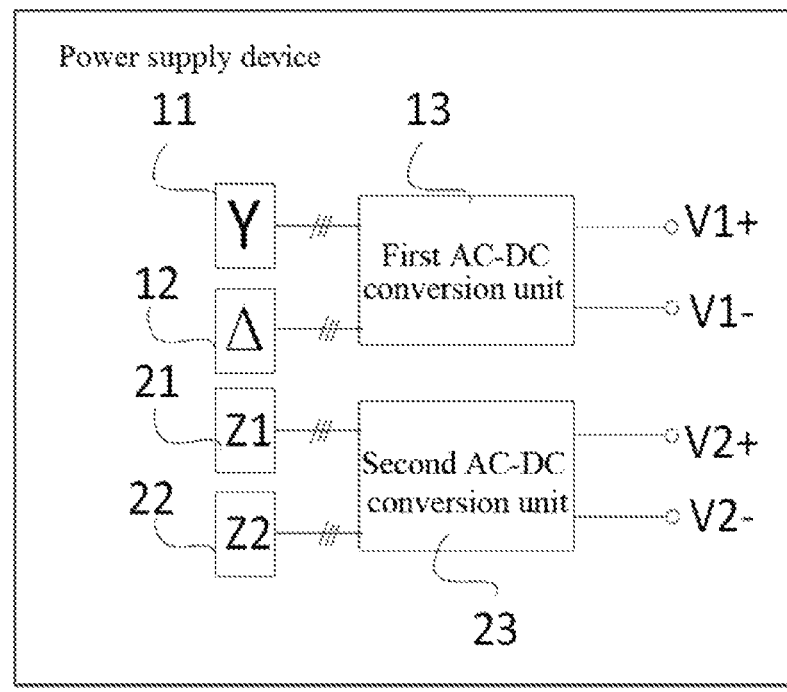
FIG. 1 is a schematic structural diagram of a power supply device provided in an embodiment of the present application.

Obviously, embodiments described are merely part of embodiments of the present application, but not all of the embodiments. Based on embodiments of the present application, all the other embodiments obtained by those skilled in the art without any creative labor belong to the protection scope of the present application.

The terms of "first", "second", "third", "fourth" and the like in the description, the claims and the above-described accompanying drawings are used to distinguish similar objects, but not necessarily describe a specific sequence or an order. It should be understood that the terms used in this way can be interchanged in an appropriate case, so as to make embodiments of the present application can be implemented in a sequence in addition to those illustrated or described herein.

It should be understood that, in various embodiments of the present application, a serial number of each process doesn't mean an order of implementation, the order of implementation of each process should be determined according to functions and internal logic thereof, and to which embodiments of the present application should not be limited.

It should be understood that, in present application, "include", "comprise" and any other variations thereof are intended to cover an non-exclusive inclusion, for example, a process, a method, a system, a product or an equipment which includes a serial of steps or units is not necessarily limited to those steps or units being listed clearly, but may include other steps or units that haven't been clearly listed or that are inherent for these process, method, system, product or equipment.

It should be understood that, in the present application, "several" means two or more than two. "And/or" is merely used to describe a relevance relationship of related objects, and indicates that there may exist three kinds of relationships. For example, A and/or B may indicate three cases: an individual existing of A, a coexisting of A and B, and an individual existing of B. A character "/" generally indicates that related objects is in an "or" relationship. "Including A, B and C" and "including A, B, C" mean an inclusion of A, B and C, "including A, B or C" means an inclusion of one of A, B and C, and "including A, B and/or C" means an inclusion of anyone, or any two, or three of A, B and C.

It should be understood that the word "connect" herein comprises any means of direct and indirect electrical connection, therefore, if it is described herein that a first element is connected with a second element, it presents that the first element can be in a direct electrical connection with the second element, or in an indirect electrical connection with the second element via other elements or connection means.

It should be understood that, in present application, "B corresponding to A" "B which is corresponding to A" "A is corresponding to B" or "B is corresponding to A" presents that B is related to A, and B can be determined according to A. B is determined according to A doesn't mean that determining B merely according to A, and B can also be determined according to A and/or other information. A matching of A and B means that a similarity of A and B is large than or equal to a preset threshold.

Depending on the context, such as "if" used herein can be explained as "when", or "while", or "in response to a determination", or "in response to a detection".

Technical solution of the present application will be described in detail below with specific embodiments. Several specific embodiments below can be mutually combined, and the same or similar concepts or processes may not be repeated in some embodiments.

In order to solve a technical problem in existing charging system that an electrical circuit is excessively complex and cost is relatively high, the present application provides a power supply device, which achieves a dual output power supply, simultaneously restrains grid-side harmonic waves and reduces a cost of electric circuits. Various alternative structures of the power supply device provided in the present application will be explained below by way of examples in combination with accompany drawings and specific embodiments.

FIG. 1 is a schematic structural diagram of a power supply device provided in an embodiment of the present application. The power supply device as shown in FIG. 1 includes: a first winding 11, a second winding 12, a third winding 21, a fourth winding 22, a first AC-DC conversion unit 13 and a second AC-DC conversion unit 23.

The first winding 11 and the second winding 12 are disposed on a secondary side of a multi-pulse transformer. It can be understood that the first winding 11 and the second winding 12 are secondary-side windings of the multi-pulse transformer. Output ends of the first winding 11 and the second winding 12 are coupled to an input of the first AC-DC conversion unit 13, an output of the first AC-DC conversion unit 13 is a first power supply terminal (V1+, V1−). The first winding 11 and the second winding 12 obtain electrical energy from a primary side of the multi-pulse transformer which is coupled with a power grid. The first AC-DC conversion unit 13 receives the electrical energy from the first winding 11 and the second winding 12 and converts the AC electrical energy into DC electrical energy. The DC electrical energy can be used to charge an equipment to be charged via the first power supply terminal. The equipment to be charged may be an electric automobile.

The third winding 21 and the fourth winding 22 are disposed on the secondary side of the multi-pulse transformer. It can be understood that the third winding 21 and the fourth winding 22 are secondary-side windings of the multi-pulse transformer. Output ends of the third winding 21 and the fourth winding 22 are coupled to an input of the second AC-DC conversion unit 23, an output of the second AC-DC conversion unit 23 is a second power supply terminal (V2+, V2−). The third winding 21 and the fourth winding 22 obtain electrical energy from the primary side of the multi-pulse transformer which is coupled with the power grid. The second AC-DC conversion unit 23 receives the electrical energy from the third winding 21 and the fourth winding 22 and converts the AC electrical energy into DC electrical energy. The DC electrical energy can be used to charge an equipment to be charged via the second power supply terminal. The equipment to be charged may be an electric automobile.

Phases of output voltages of the first winding 11, the third winding 21, the second winding 12 and the fourth winding 22 are successively shifted left or successively shifted right for 15°. For example, the phase of the output voltage of the third winding 21 is shifted left for 15° relative to the phase of the output voltage of the first winding 11, the phase of the output voltage of the second winding 12 is shifted left for 15° relative to the phase of the output voltage of the third winding 21, and the phase of the output voltage of the fourth winding 22 is shifted left for 15° relative to the phase of the output voltage of the second winding 12.

In the power supply device of this embodiment, the first winding and the second winding of the power supply device are disposed on the secondary side of the multi-pulse transformer, the outputs of the first winding and the second winding are coupled to the input of the first AC-DC conversion unit, and the output of the first AC-DC conversion unit is the first power supply terminal. And the third winding and the fourth winding are disposed on the secondary side of the multi-pulse transformer, the output of the third winding and the fourth winding are coupled to the input of the second AC-DC conversion unit, the output of the second AC-DC conversion unit is the second power supply terminal. The phases of output voltages of the first winding, the third winding, the second winding and the fourth winding are successively shifted left or successively shifted right for 15°.

The power supply device can achieve a dual output power supply, restrain the grid-side harmonic waves and reduce the cost of electric circuits.

For example, when an equipment to be charged is connected to the first power supply terminal, substantially an current flowing into the power grid contains a fundamental wave and $12k\pm1$-th harmonic waves, $k=1, 2, 3 \ldots$, and $6k\pm1$-th harmonic waves are offset, where k is an odd integer. Thereby, harmonic waves into the power grid decrease. When two equipments are respectively connected to the first power supply terminal and the second power supply terminal to be charged, substantially the current flowing into the power grid merely contains a fundamental wave and $24k\pm1$-th harmonic waves, $k=1, 2, 3 \ldots$, and $12k\pm1$-th harmonic waves are offset, where k is an odd integer. Thereby, harmonic waves into the power grid further decrease. The power supply device of the present application has compatibility, and can flexibly arrange a power supply mode according to actual demands.

The first winding 11, the second winding 12, the third winding 21 and the fourth winding 22 have many kinds of structures. In some embodiments, the first winding 11 can be a star winding; the second winding 12 can be a delta winding; the third winding 21 can be an epitaxy delta winding; and the fourth winding 22 can be an epitaxy delta winding. But structures of the first winding 11, the second winding 12, the third winding 21 and the fourth winding 22 of the present application are not limited, as long as their phases of the output voltages are successively shifted left or successively shifted right for 15°.

The first AC-DC conversion unit 13 can have many implementations, and two kinds of alternative electrical circuit structures of the first AC-DC conversion unit 13 are explained below in combination with accompanying drawings.

Figure 2:
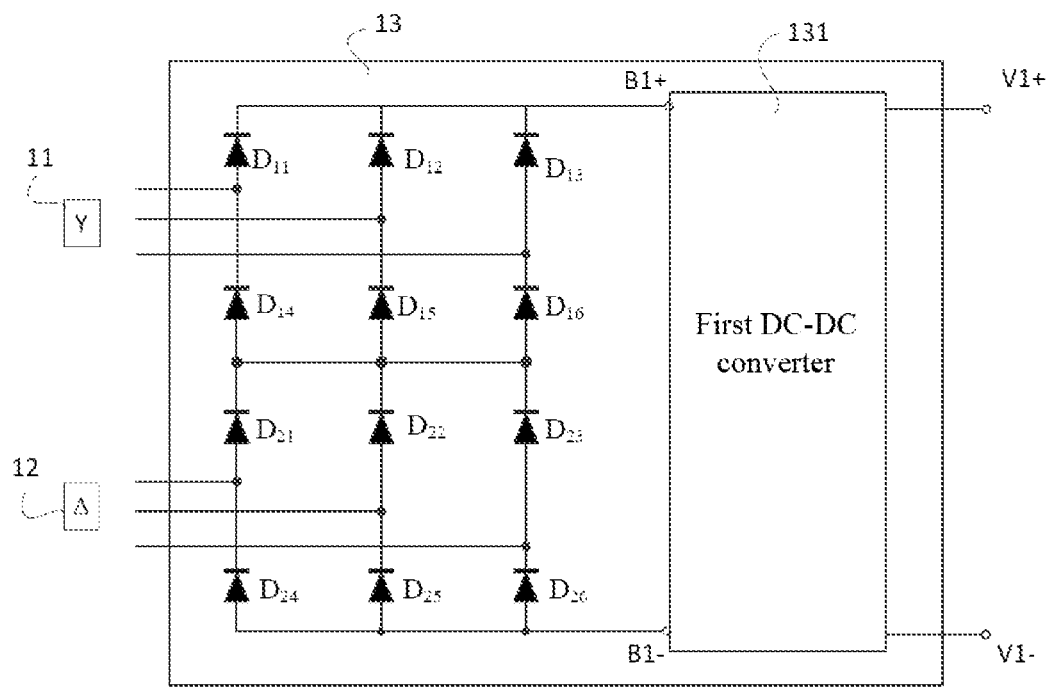
FIG. 2 is a schematic structural diagram of a first AC-DC conversion unit provided in an embodiment of the present application.
Figure 3:
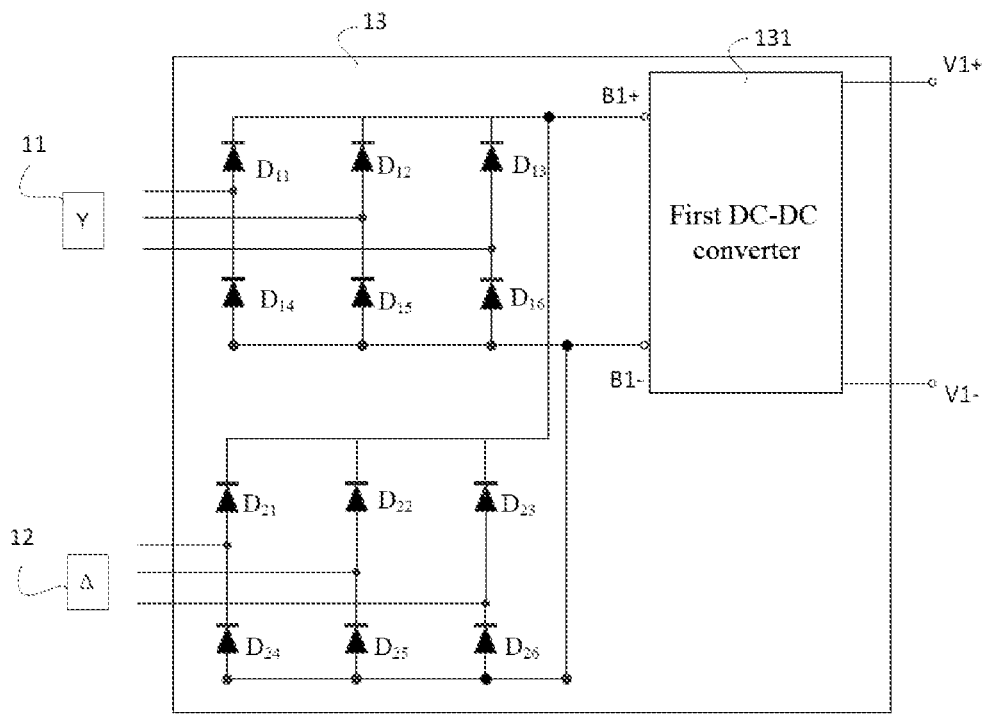
FIG. 3 is a schematic structural diagram of another first AC-DC conversion unit provided in an embodiment of the present application.

FIG. 2 is a schematic structural diagram of the first AC-DC conversion unit according to one embodiment of the present invention. FIG. 3 is a schematic structural diagram of the first AC-DC conversion unit according to another embodiment of the present invention. Referring to FIG. 2 and FIG. 3, the first AC-DC conversion unit 13 includes a first rectifier and a second rectifier. The first rectifier consists of six diodes of $D_{11}, D_{12}, D_{13}, D_{14}, D_{15},$ and $D_{16}$, and the second rectifier consists of six diodes of $D_{21}, D_{22}, D_{23}, D_{24}, D_{25},$ and $D_{26}$. The first AC-DC conversion unit 13 can also include more rectifiers, while the structure including the first rectifier and the second rectifier as shown in FIG. 2 and FIG. 3 is taken as an example.

As shown in FIG. 2 and FIG. 3, the first rectifier is coupled to the first winding 11. Specifically, an input of the first rectifier is coupled to the output of the first winding 11, the three-phase alternating current of the first winding 11 is input into the first rectifier which performs a conversion from alternating current to direct current. The second rectifier is coupled to the second winding 12. Specifically, an input of the second rectifier is coupled to the output of the second winding 12, the three-phase alternating current of the second winding 12 is input into the second rectifier which performs the conversion from alternating current to direct current. In some embodiments, the outputs of the first rectifier and the second rectifier are connected in series. In other embodiments, the outputs of the first rectifier and the second rectifier are connected in parallel.

Referring to FIG. 2, the outputs of the first rectifier and the second rectifier are connected in series to form the first port (B1+, B1−) The first AC-DC conversion unit 13 further includes a first DC-DC converter 131. As shown in FIG. 2, the first DC-DC converter 131 is connected between the first port and the first power supply terminal.

Referring to FIG. 3, the outputs of the first rectifier and the second rectifier are connected in parallel to form the first port (B1+, B1−) Similarly, the first AC-DC conversion unit 13 further includes the first DC-DC converter. The first DC-DC converter is connected between the first port and the first power supply terminal.

Similarly, the second AC-DC conversion unit includes a third rectifier and a fourth rectifier. The third rectifier is coupled to the third winding 21. Specifically, an input of the third rectifier is coupled to the output of the third winding 21, and the three-phase alternating current of the third winding 21 is converted to direct current by the third rectifier. The fourth rectifier is coupled to the fourth winding 22. Specifically, an input of the fourth rectifier is coupled to the output of the fourth winding 22, and the three-phase alternating current of the fourth winding 22 is converted to direct current by the fourth rectifier.

In some embodiments, the outputs of the third rectifier and the fourth rectifier are connected in series to form a second port. The second AC-DC conversion unit further includes a second DC-DC converter which is connected between the second port and the second power supply terminal (V2+, V2−). The structure of the second AC-DC conversion unit is similar to the first AC-DC conversion unit in FIG. 2, and the schematic diagram of FIG. 2 can be referred.

In other embodiments, the outputs of the third rectifier and the fourth rectifier are connected in parallel to form the second port. The second AC-DC conversion unit further includes the second DC-DC converter which is connected between the second port and the second power supply terminal (V2+, V2−). The structure of the second AC-DC conversion unit is similar to the first AC-DC conversion unit in FIG. 3, and the schematic diagram of FIG. 3 can be referred.

In above embodiments, the structures of the first DC-DC conversion unit and the second DC-DC conversion unit can be the same or different, no limitations are defined to specific structures of the first DC-DC conversion unit and the second DC-DC conversion unit herein.

Figure 4A:
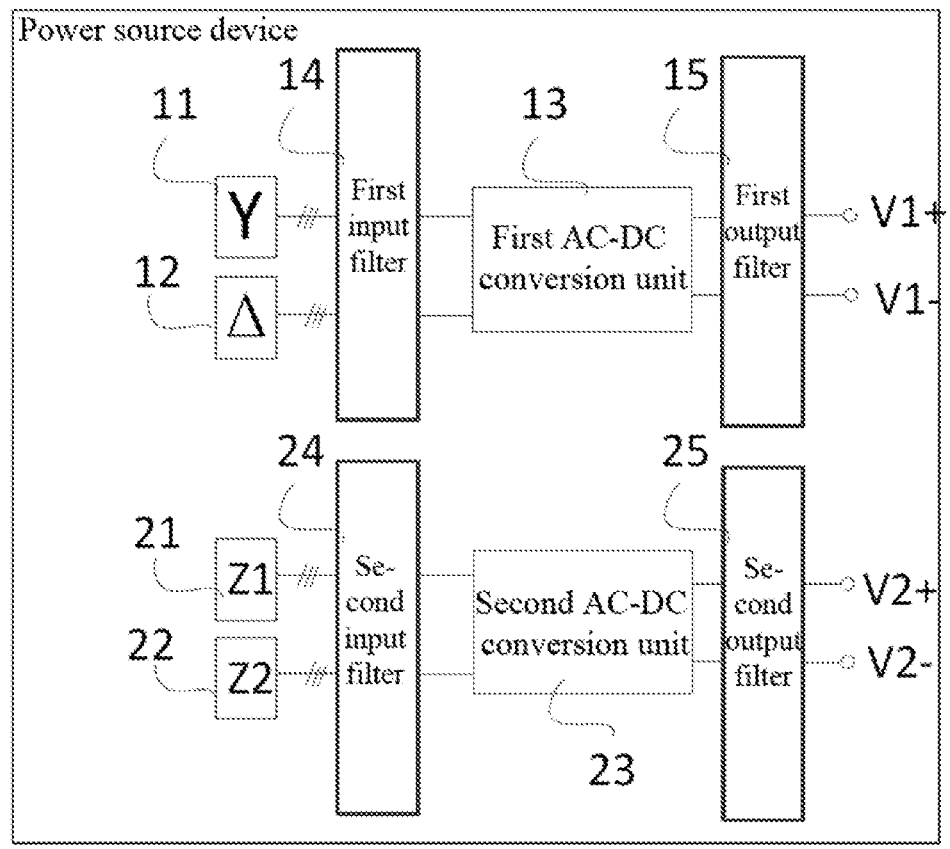
FIG. 4A is a schematic structural diagram of another power supply device provided in an embodiment of the present application.

In some embodiments, in order to further reduce the harmonic wave, the present application provides another power supply device, a schematic structural diagram of which is shown in FIG. 4A. The first AC-DC conversion unit 13 is taken as an example to explain, and the structure of the second AC-DC conversion unit 23 can be analogized accordingly. The power supply device as shown in FIG. 4A can also include: a first input filter 14, a second input filter 24, a first output filter 15 and a second output filter 25. The outputs of the first winding 11 and the second winding 12 are coupled to the input of the first AC-DC conversion unit 13 via the first input filter 14, and the output of the first AC-DC conversion unit 13 is electrically connected to the first power supply terminal (V1+, V1−) via the first output filter 15. The output of the third winding 21 and the fourth winding 22 are coupled to the input of the second AC-DC conversion unit 23 via the second input filter 24, and the output of the second AC-DC conversion unit 23 is electrically connected to the second power supply terminal (V2+, V2−) via the second output filter 25. The power supply device in FIG. 4A can further reduce the harmonic waves by adding the input filters and the output filters. The first input filter 14 and the second input filter 24 can consist of one or more groups of filters, to which no limitation is defined herein.

Figure 4B:
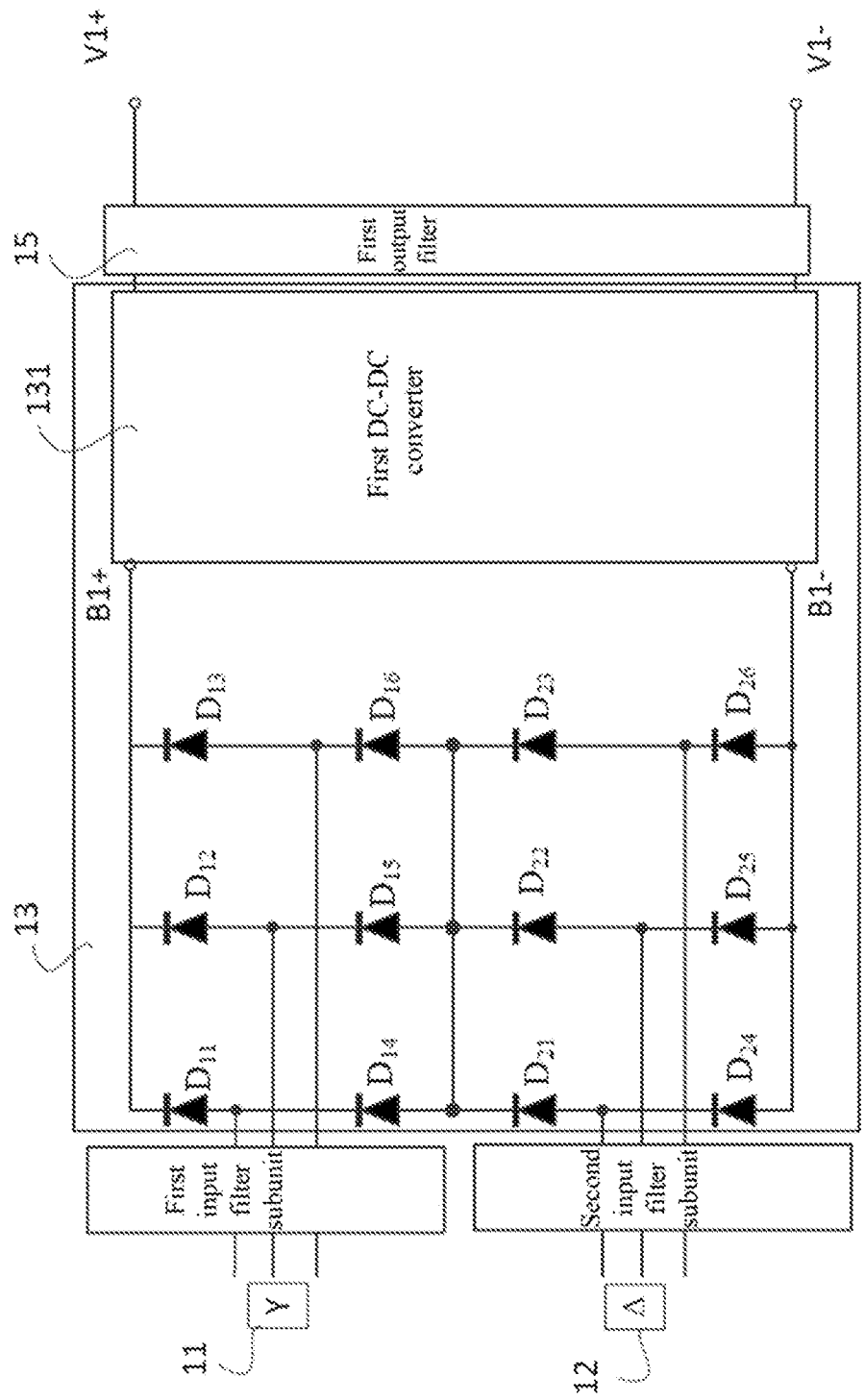
FIGS. 4B to 4D are three alternative examples of FIG. 4A provided in an embodiment of the present application.
Figure 4C:
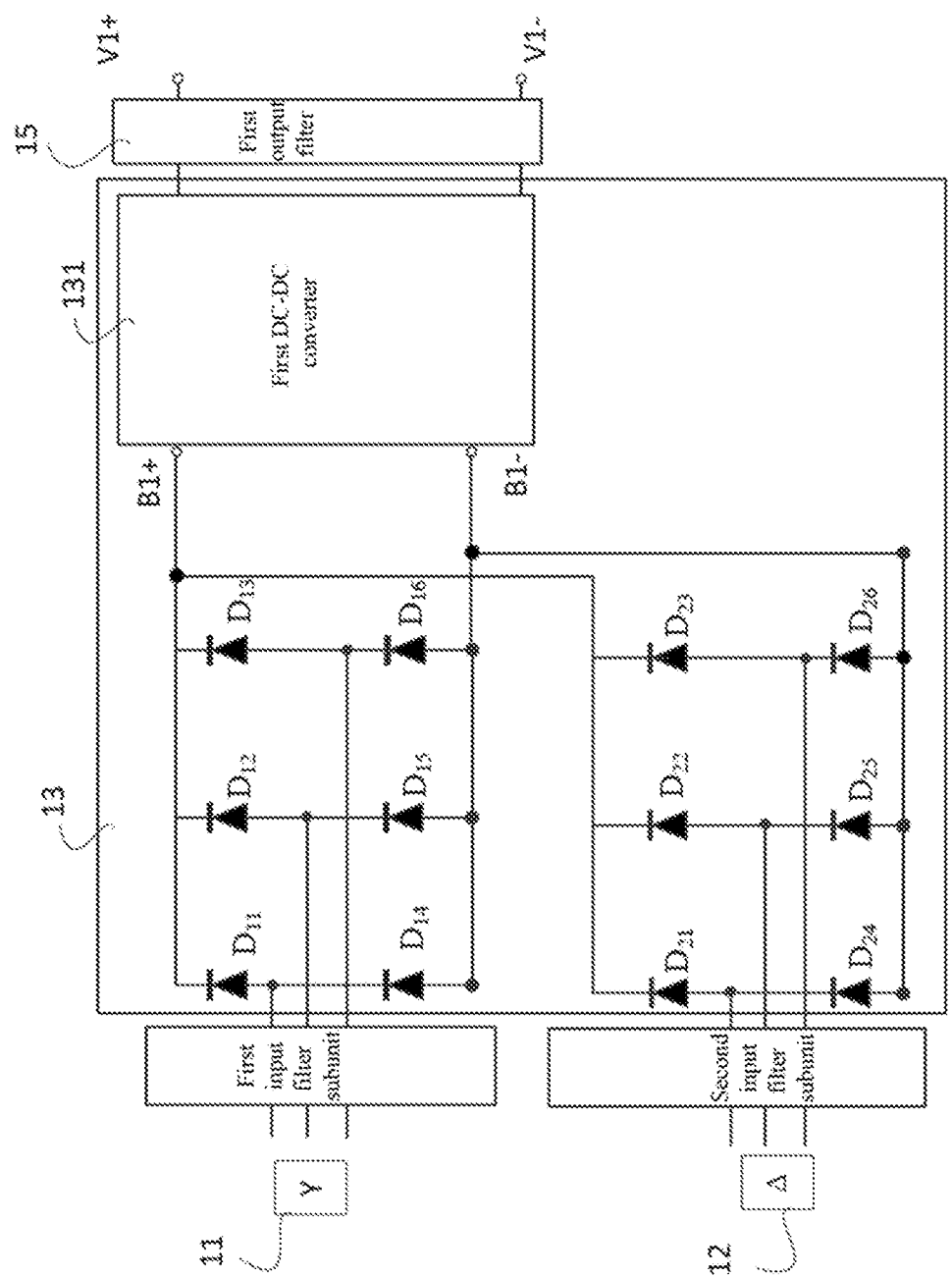
Figure 4D:
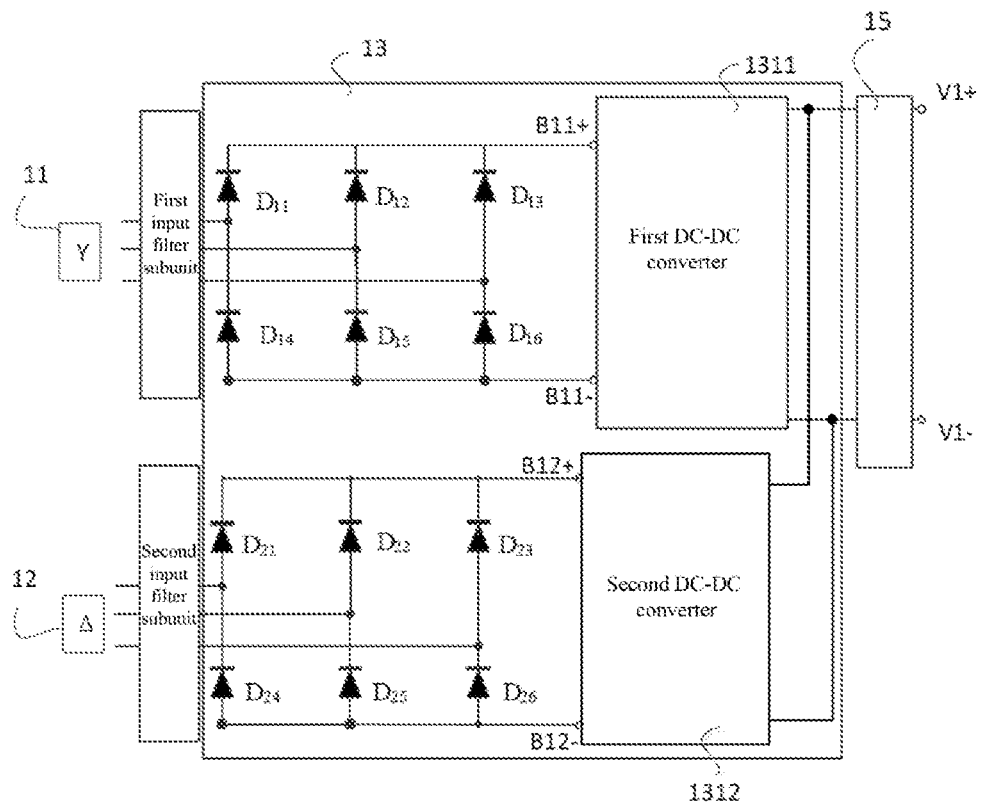

In the structure as shown in FIG. 4A, the first input filter 14, the second input filter 24, the first output filter 15 and the second output filter 25 are added into the first AC-DC conversion unit 13 and the second AC-DC conversion unit 23, to reduce the harmonic waves. The first AC-DC conversion unit 13 is taken as an example below to show the specific implementation of FIG. 4A, and the second AC-DC conversion unit 23 can be the same with the first AC-DC conversion unit 13, which wouldn't be repeated. Referring to FIG. 4B to 4D, they are three alternative examples of FIG. 4A.

In the embodiment as shown in FIG. 4B, the outputs of the first rectifier and the second rectifier are connected in series to form the first port (B1+, B1−), the first input filter 14 can specifically include a first input filtering subunit and a second input filtering subunit. The first input filtering subunit is set at the input of the first rectifier to perform a filtration to the input voltage of the first rectifier, and the second input filtering subunit is set at the input of the second rectifier to perform a filtration to the input voltage of the second rectifier. Hereby, the harmonic waves are reduced.

In the embodiment as shown in FIG. 4C, the outputs of the first rectifier and the second rectifier are connected in parallel to form the first port (B1+, B1−), and the first input filter 14 can specifically include the first input filtering subunit and the second input filtering subunit. The first input filtering subunit is set at the input of the first rectifier to perform the filtration to the input voltage of the first rectifier, and the second input filtering subunit is set at the input of the second rectifier to perform the filtration to the input voltage of the second rectifier. Hereby, the harmonic waves are reduced.

In the embodiment as shown in FIG. 4D, the first AC-DC conversion unit 13 can include a first DC-DC converter 1311 and a second DC-DC converter 1312. In the present embodiment, the first rectifier has the first port (B11+, B11−), and the second rectifier has the second port (B12+, B12−). The output of the first rectifier is connected to an input of the first DC-DC converter 1311 via the first port (B11+, B11−), and the output of the second rectifier is connected to an input of the second DC-DC converter 1312 via the second port (B12+, B12−). Outputs of the first DC-DC converter 1311 and the second DC-DC converter 1312 are connected in parallel to form the first power supply terminal (V1+, V1−). The first input filter 14 can specifically include the first input filtering subunit and the second input filtering subunit. The first input filtering subunit is set at the input of the first rectifier to perform the filtration to the input voltage of the first rectifier, and the second input filtering subunit is set at the input of the second rectifier to perform the filtration to the input voltage of the second rectifier. Hereby, the harmonic waves are reduced.

Figure 5:
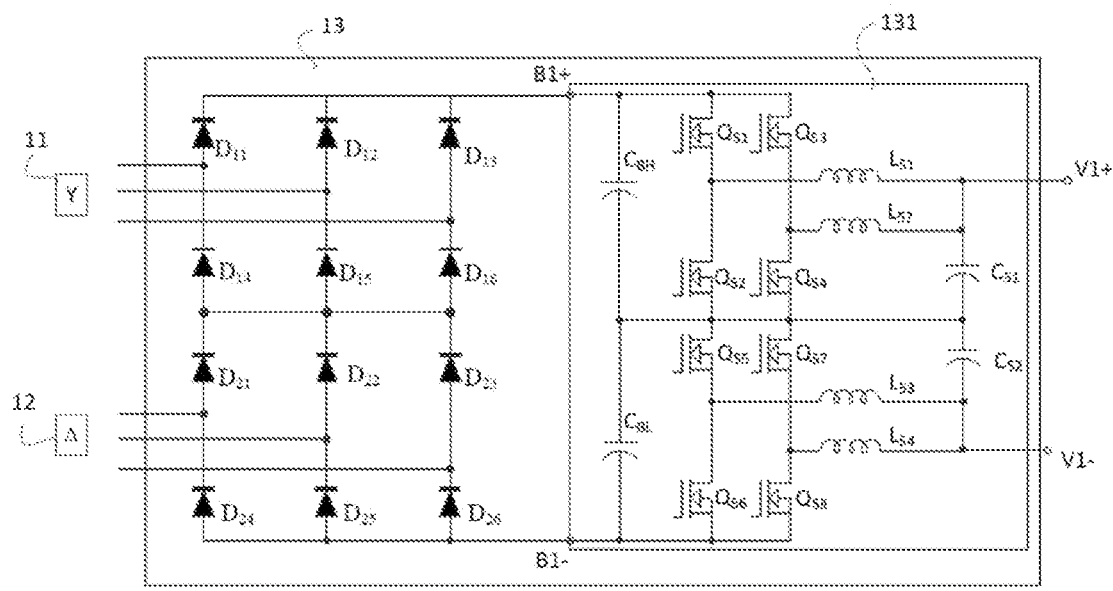
FIG. 5 is a schematic structural diagram of another first AC-DC conversion unit provided in an embodiment of the present application.

FIG. 5 is a schematic structural diagram of the first AC-DC conversion unit according another embodiment of the invention. The first DC-DC converter 131 mainly includes busbar capacitances CBH and CBL, power tubes Q51, Q52, Q53, Q54, Q55, Q56, Q57 and Q58, output inductance L51, L52, L53 and L54, and output capacitance C51 and C52. The power tubes Q51, Q52, Q53 and Q54, form a first direct current conversion circuit, and the power tubes Q55, Q56, Q57 and Q58 form a second direct current conversion circuit. Of course, the present application is not limited to this. The current obtained from the first port (B1+, B1−) is output to the first power supply terminal (V1+, V1−) as direct current, after converted by the first DC-DC converter 131 as shown in FIG. 5.

In some embodiments, such as the embodiments as shown in FIG. 2 and FIG. 3, both of the first rectifier and the second rectifier are uncontrollable rectifier. The uncontrolled rectifier has a simple structure of electrical circuit and low cost. However, the first rectifier and the second rectifier can also be active rectifiers, to which no limitation is defined herein.

In some embodiments, both of the third rectifier and the fourth rectifier are the uncontrollable rectifier. The uncontrolled rectifier has a simple structure of an electrical circuit and low cost. However, the third rectifier and the fourth rectifier can also be active rectifiers, to with no limitation is defined herein.

In above embodiments, preferably, the first rectifier, the second rectifier, the third rectifier and the fourth rectifier have the same structure. When the first power supply terminal (V1+, V1−) and the second power supply terminal (V2+, V2−) simultaneously works, the 12k±1-th harmonic waves can be completely offset, thereby achieving a better power factor. k is an odd integer.

Figure 6:
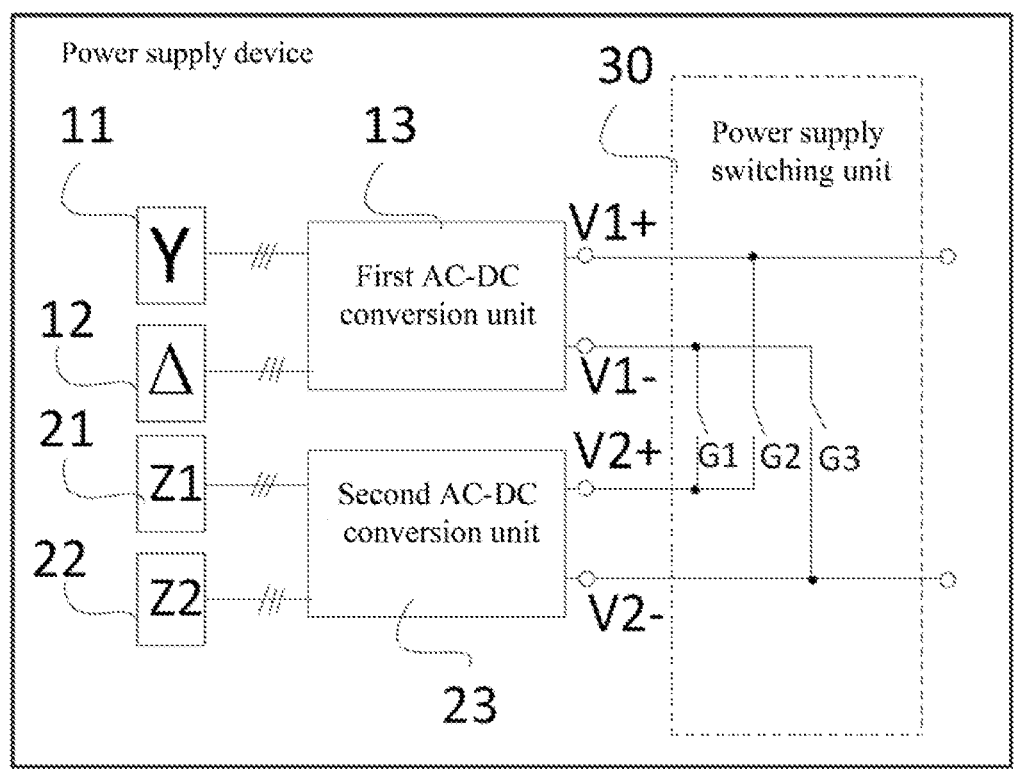
FIG. 6 is a schematic structural diagram of another power supply device provided in an embodiment of the present application.

In some embodiments, different output voltages or currents can be provided by changing the connection between the first power supply terminal and the second power supply terminal, to adapt to various charging demands. FIG. 6 is a schematic structural diagram of the power supply device according to another embodiment of the invention. The power supply device in FIG. 6 can also include a power supply switching unit 30.

The power supply switching unit 30 includes a first switch component G1, a second switch component G2 and a third switch component G3. The first switch component G1 is connected between a negative pole of the first power supply terminal V1− and a positive pole of the second power supply terminal V2+; the second switch module G2 is connected between a positive pole of the first power supply terminal V1+ and the positive pole of the second power supply terminal V2+; and the third switch component G3 is connected between the negative pole of the first power supply terminal V1− and a negative pole of the second power supply terminal V2−. Further, the second switch component G2 is linked with the third switch component G3.

When the first switch component G1 is on and the second switch component G2 and the third switch component G3 are off in a linkage, the first power supply terminal and the second power supply terminal are in the series connection, thereby improving the output voltage, which can be used to provide charging power to a high-voltage equipment to be charged.

When the first switch component G1 is off and the second switch component G2 and the third switch component G3 are on in a linkage, the first power supply terminal and the second power supply terminal are in the parallel connection, thereby improving the output current, which can be used to provide charging power to a low-voltage and large-current equipment to be charged When the first switch component G1 is off and the second switch component G2 and the third switch component G3 are off in a linkage, the first power supply terminal and the second power supply terminals are two independent power supply terminals.

T The power supply device of the present application includes: the first AC-DC conversion unit 13 and the second AC-DC conversion unit 23. The input of the first AC-DC conversion unit 13 is configured to connect with the output of the first winding and the output of the second winding. The first winding and the second winding are configured to be disposed on the secondary side of the multi-pulse transformer. The output of the first AC-DC conversion unit 13 is the first power supply terminal. The input of the second AC-DC conversion unit 23 is configured to connect with the output of the third winding and the output of the fourth winding. The third winding and the fourth winding are configured to be disposed on the secondary side of the multi-pulse transformer. The output of the second AC-DC conversion unit 23 is the second power supply terminal. Various possible embodiments of the power supply device as shown in FIG. 1 can be illustrated with reference to above-described examples as shown in FIG. 1 to FIG. 6, which wouldn't be repeated herein.

Figure 7:
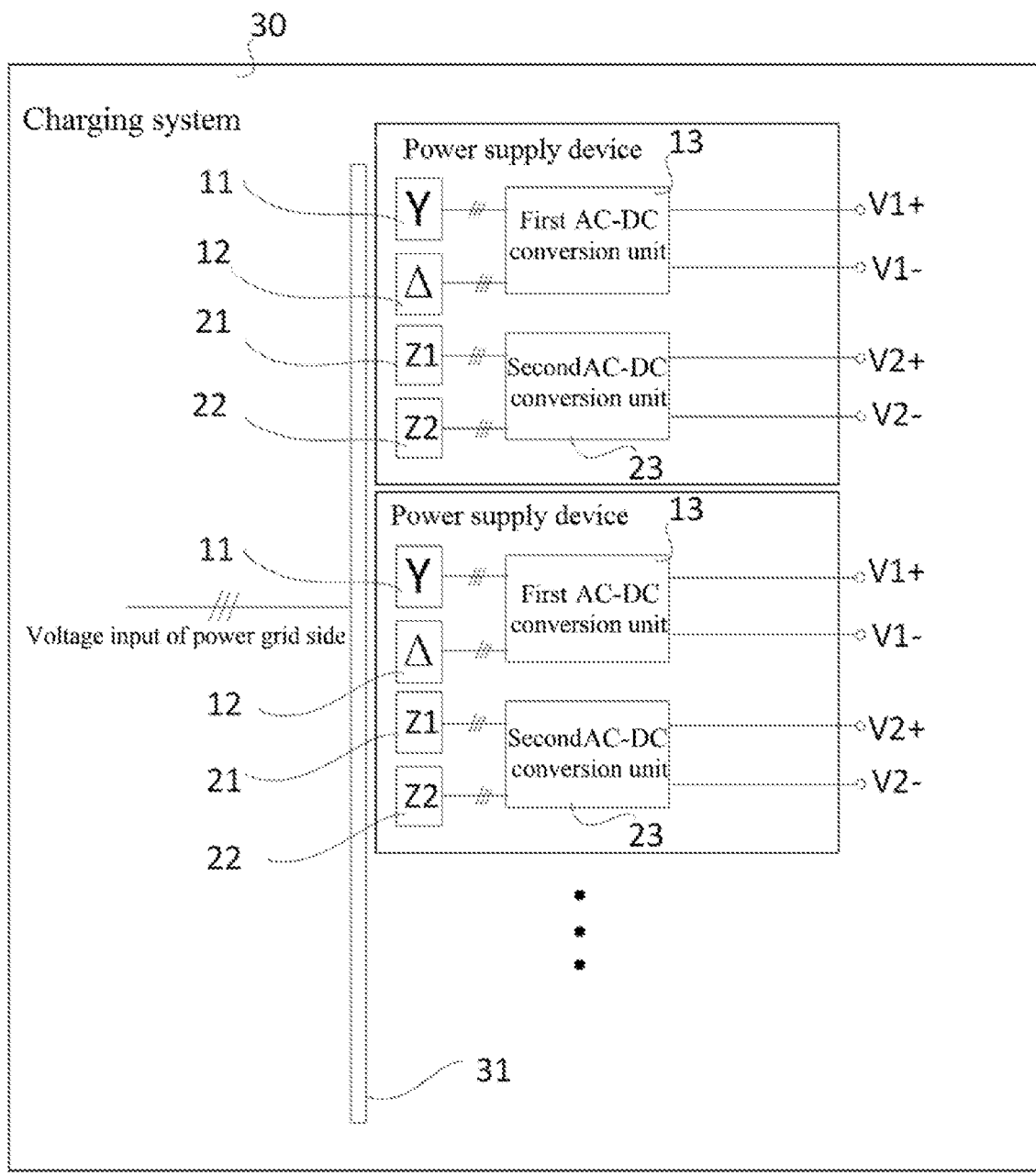
FIG. 7 is a schematic structural diagram of a charging system provided in an embodiment of the present application.

FIG. 7 is a schematic structural diagram of a charging system according to one embodiment of the present application. The charging system as shown in FIG. 7 includes: the multi-pulse transformer 31 and the power supply device described in any of above-described various embodiments. And the number of the power supply devices is larger than or equal to two.

A primary-side winding of the multi-pulse transformer 31 is electrically connected with the power grid to obtain a voltage of the power grid. And secondary-side windings of the multi-pulse transformer 31 include the first winding 11, the second winding 12, the third winding 21 and the fourth winding 22.

In some embodiments, the primary-side winding of the multi-pulse transformer 31 can be a star winding, or a delta winding.

In some embodiments, the number of the power supply devices is larger than or equal to two. If the number of the power supply devices is M, the charging system can provide 2M power supply terminals, so as to satisfy charging demands of 2M equipment charged. Compared with a charging system consisting of M power supply devices with singular power supply terminal, the charging system of the invention can arrange the power supply terminals more flexible, thereby improving a resource utilization rate.

Figure 8:
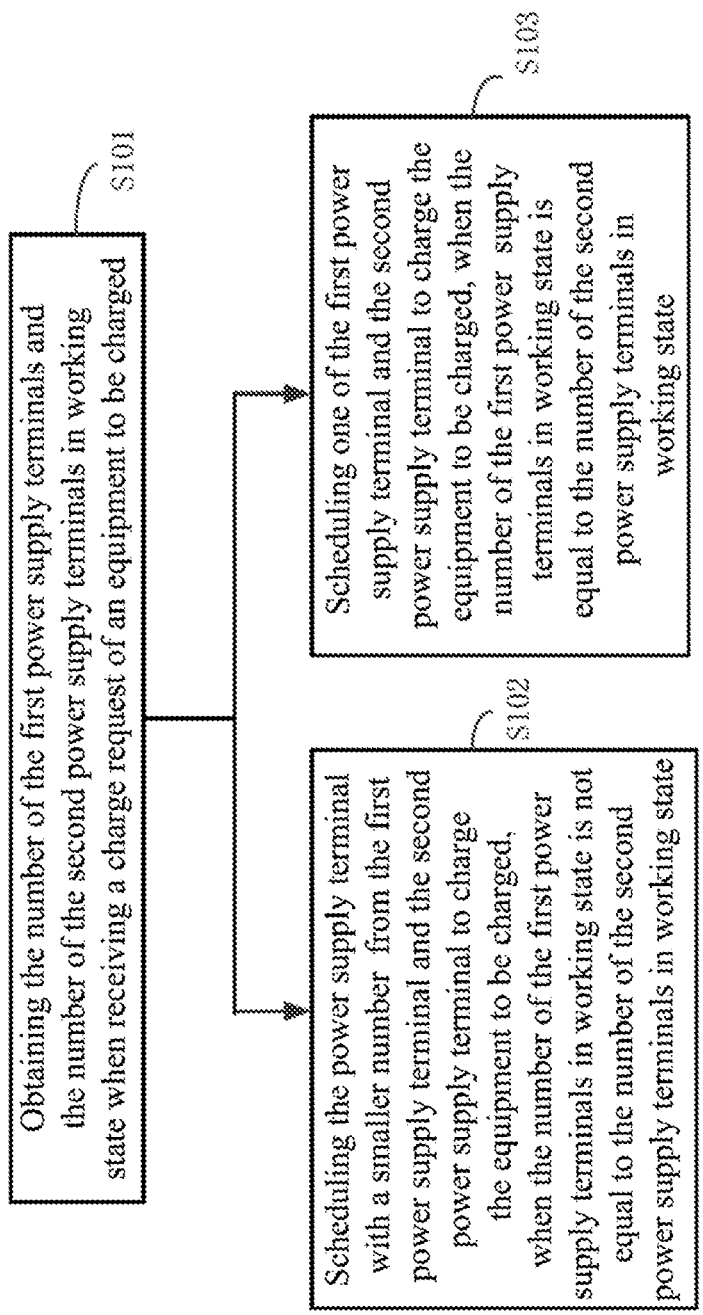
FIG. 8 is a flowchart of a charge scheduling method provided in an embodiment of the present application.

FIG. 8 is a flowchart of a charge scheduling method according to one embodiment of the invention. An executive subject of the method as shown in FIG. 8 can be software and/or hardware, for example, can be a charge scheduling device of a charge station or an online appointment scheduling system. The charge scheduling method as shown in FIG. 8 includes steps S101 to S103, which is specifically as below:

S101 obtaining the number of the first power supply terminals and the number of the second power supply terminals in working state when receiving a charge request of an equipment to be charged.

For example, a user reserves a charging place and/or a charging period through the network, or the charge scheduling device sends a charge request when detecting an electric vehicle entering a charge station. Once the charging request is received, the charge scheduling device immediately obtains the number of the first power supply terminals and the number of the second power supply terminals in working state.

S102 scheduling the power supply terminal with a smaller number from the first power supply terminal and the second power supply terminal to charge the equipment to be charged, when the number of the first power supply terminals in working state is not equal to the number of the second power supply terminals in working state. Specifically, schedule the first power supply terminal to charge the equipment to be charged, when the number of the first power supply terminals in working state is less than the number of the second power supply terminals in working state; otherwise, schedule the second power supply terminal to charge the equipment to be charged, when the number of the second power supply terminals in working state is less than the number of the first power supply terminals in working state. In order to minimize the harmonic wave current, the difference between the number of the first power supply terminals and the number of the second power supply terminals in working state should be reduced.

For example, the number of the first power supply terminals in working state is thirty-four, and the number of the second power supply terminals in working state is thirty-five. When there is an electric automobile entering the charge station and requesting charge, the first power supply terminal is scheduled to charge the electric automobile accordingly. A specific way that the first power supply terminal charges the electric automobile can be starting one charge pile corresponding to a first power supply terminal in idle state, and providing a position or an identification code of the charge pile to the user of the electric automobile.

S103 scheduling one of the first power supply terminal and the second power supply terminal to charge the equipment to be charged, when the number of the first power supply terminals in working state is equal to the number of the second power supply terminals in working state.

For example, the number of the first power supply terminals in working state is thirty-five, and the number of the second power supply terminals in working state is thirty-five. When there is an electric automobile entering the charge station and requesting for charging, the first power supply terminal or the second power supply terminal in idle state can be scheduled randomly to charge the electric automobile.

In some embodiments, estimated remaining charge time can also be considered in the step S103 to determine whether the first power supply terminal or the second power supply terminal should be scheduled to charge the equipment to be charged. Specifically, if the number of the first power supply terminals in working state is equal to the number of the second power supply terminals in working state, then estimated remaining charge time of each of the first power supply terminals in working state and estimated remaining charge time of each of the second power supply terminal in working state would be obtained. And schedule a power supply terminal with less estimated remaining charge time to charge the equipment to be charged. For example, if the power supply terminal with the least estimated remaining charge time is the first power supply terminal, then a first power supply terminal in idle state would be scheduled to charge the equipment to be charged. If the power supply terminal with the least estimated remaining charge time is the second power supply terminal, then a second power supply terminal in idle state would be scheduled to charge the equipment to be charged. For example, the number of the first power supply terminals in working state is thirty-five, and the number of the second power supply terminals in working state is thirty-five. The charge process of one among the thirty-five first power supply terminals will be finished after 10 minutes, while the remaining charge time of all the other first power supply terminals and all the second power supply terminals in working state is more than 1 hour. Now, there is an electric automobile entering the charge station and requesting for charging. In order to maintain the number of the first power supply terminals in working state equals to the number of the second power supply terminals in working state to the maximum extent, the charge scheduling device determines to schedule the first power supply terminal to charge the equipment to be charged.

According to the charge scheduling method provided in the invention, the number of the first power supply terminals and the number of the second power supply terminals in working state are obtained when receiving the charge request of the equipment to be charged; the power supply terminal with the smaller number from the first power supply terminal and the second power supply terminal is scheduled to charge the equipment to be charged, when the number of the first power supply terminals in working state is not equal to the number of the second power supply terminals in working state; and one of the first power supply terminal and the second power supply terminal in idle state is scheduled to charge the equipment to be charged, when the number of the first power supply terminals in working state is equal to the number of the second power supply terminals in working state. Thereby, the number of the first power supply terminals and the number of the second power supply terminals simultaneously in working state can be maintained at a similar level, so that the power supply device works approximately or similarly as a power supply equipment with twenty-four pulse wave, thereby improving the effect of restraining the harmonic waves of the power supply device.

Table 1 is a content of grid side harmonic waves when using the charge scheduling method of the present application. And these data are obtained via an emulation of charging an electric automobile. When the number of the electric automobiles charged reaches three, the content of the harmonic waves starts to be reduced obviously.

TABLE 1

| The number of electric automobile | The first power supply terminal | The second power supply terminal | Content of the grid side harmonic wave |
|---|---|---|---|
| 1 | 1 | 0 | 7.68% |
| 3 | 2 | 1 | 2.48% |
| 5 | 3 | 2 | 1.85% |
| 7 | 4 | 3 | 1.59% |
| 9 | 5 | 4 | 1.49% |
| 11 | 6 | 5 | 1.47% |

Figure 9:
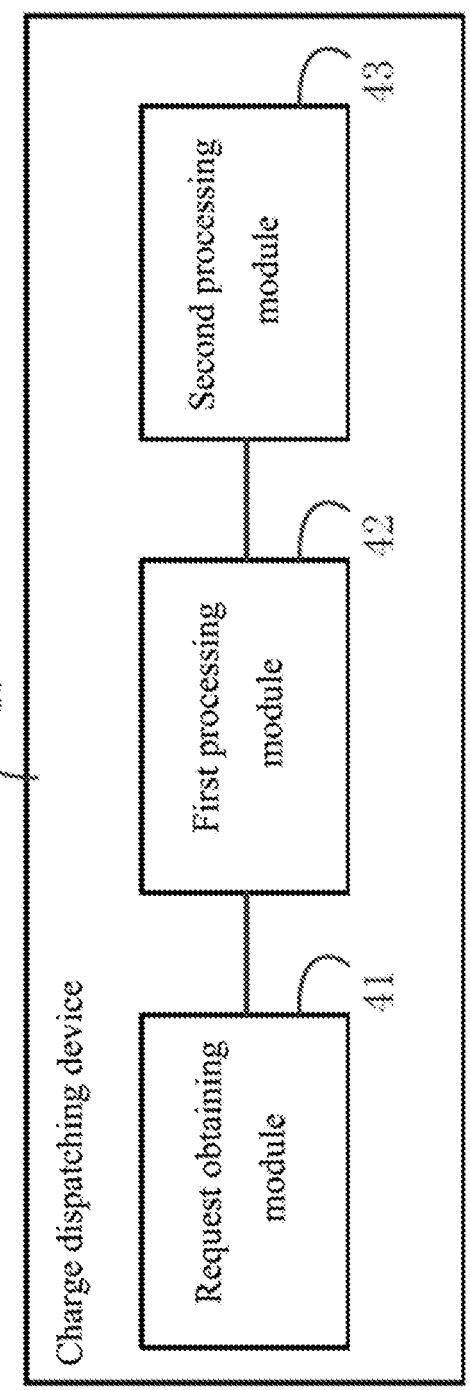
FIG. 9 is a schematic structural diagram of a charge scheduling device provided in an embodiment of the present application.

FIG. 9 is a schematic structural diagram of a charge scheduling device according to one embodiment of the present application. The charge scheduling device 40 shown in FIG. 9 includes:

a request obtaining module 41, configured to obtain the number of the first power supply terminals and the number of the second power supply terminals in working state, when receiving the charge request of the equipment to be charged;

a first processing module 42, configured to schedule the power supply terminal with a smaller number from the first power supply terminal and the second power supply terminal to charge the equipment to be charged, when the number of the first power supply terminals in working state is not equal to the number of the second power supply terminals in working state; and a second processing module 43, configured to schedule one of the first power supply terminal and the second power supply terminal to charge the equipment to be charged, when the number of the first power supply terminals in working state is equal to the number of the second power supply terminals in working state.

Based on above-described embodiments, the second processing module 43 is configured to obtain estimated remaining charge time of each of the first power supply terminals in working state and estimated remaining charge time of each of the second power supply terminal in working state, when the number of the first power supply terminals in working state is equal to the number of the second power supply terminals in working state; and schedule the first power supply terminal in idle state to charge the equipment to be charged, when the power supply terminal with less estimated remaining charge time is the first power supply terminal; or schedule the second power supply terminal in idle state to charge the equipment to be charged, when the power supply terminal with less estimated remaining charge time is the second power supply terminal.

The charge scheduling device of the embodiment as shown in FIG. 9 can be configured to execute the steps of the method embodiment as shown in FIG. 8 accordingly, and an implementation principle and a technical effect thereof are similar, which wouldn't be repeated herein.

Figure 10:
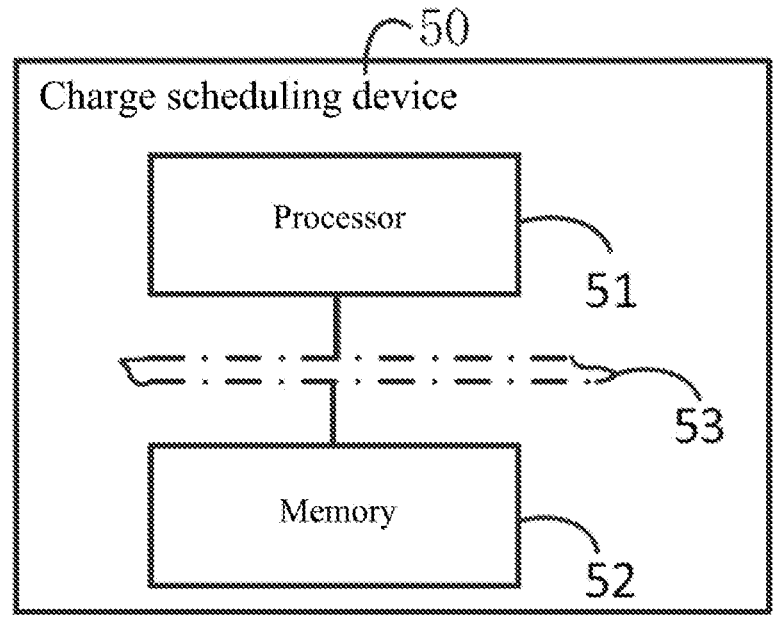
FIG. 10 is a schematic structural diagram of a hardware of a charge scheduling device provided in an embodiment of the present application.

FIG. 10 is a schematic structural diagram of a hardware of the charge scheduling device provided according to one embodiment of the present application, and the charge scheduling device 50 includes: a processor 51, a memory 52 and a computer program.

The memory 52 is configured to store the computer program, the memory can also be a flash. The computer program, for example, is an application program, functional module and the like, which are configured to implement above-described method.

The processor 51 is configured to execute the computer program stored in the memory, to implement various steps executed by the charge scheduling device in above-described method. Relative description of the previous method embodiment can be referred for details.

Optionally, the memory 52 can be independent, or integrated with the processor 51.

When the memory 52 is a component independent from the processor 51, the charge scheduling device can also include a bus 53, configured to connect the memory 52 and the processor 51.

The power supply device provided in the present application is not limited to above-described embodiments. Please refer to FIG. 11A, which is a schematic structural diagram of the power supply device according to another embodiment of the present application. As shown in the figure, the power supply device includes: P winding pairs, P AC-DC conversion units and P power supply terminals, where P is a positive integer larger than or equal to two.

Figure 11A:
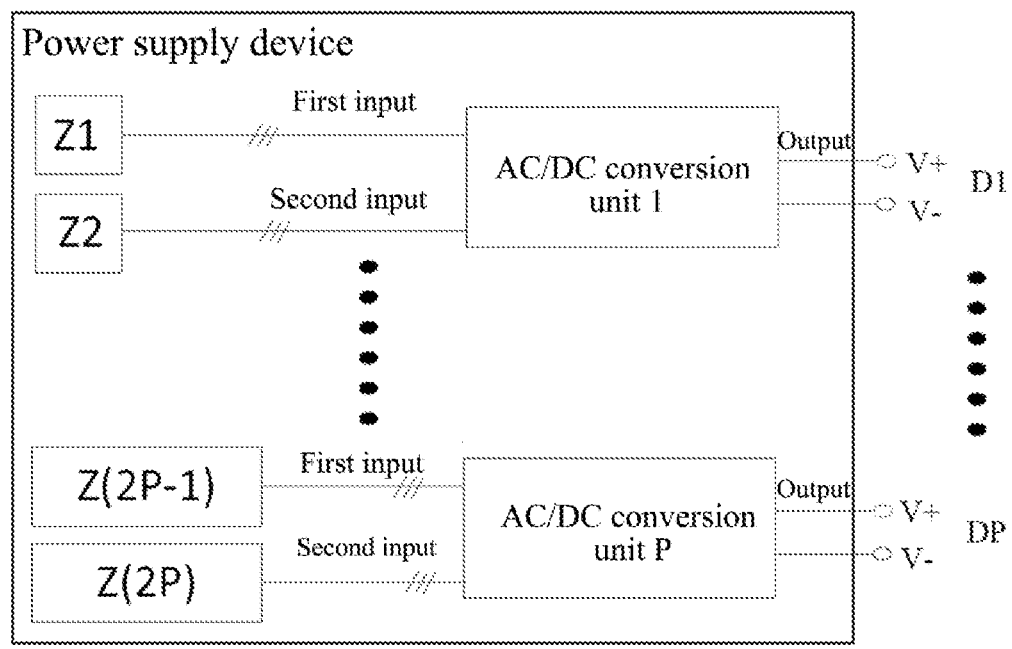
FIG. 11A is a schematic structural diagram of another power supply device provided in an embodiment of the present application.

In FIG. 11A, each of the P winding pairs includes the first winding and the second winding. The first winding pairs (corresponding to the winding pairs in the top of the FIG. 11A) include the first winding Z1 and the second winding Z2, the P-th winding pairs (corresponding to the winding pairs in the bottom of the FIG. 11A) include the first winding Z(2P−1) and the second winding Z(2P). P AC-DC conversion units are correspondence with the P winding pairs in one-to-one ratio, each of the AC-DC conversion units includes a first input, a second input and an output. The first input is electrically connected to the first winding of the corresponding winding pair, and the second input is electrically connected to the second winding of the corresponding winding pair. As shown in FIG. 11A, the AC-DC conversion unit 1 is coupled to the first winding pairs, specifically, the first input of the AC-DC conversion unit 1 is electrically coupled to the winding Z1, and the second input of the AC-DC conversion unit 1 is electrically coupled to the winding Z2; and the AC-DC conversion unit P is coupled to the P-th winding pairs, specifically, the first input of the AC-DC conversion unit P is coupled to the winding Z(2P−1), and the second input of the AC-DC conversion unit P is coupled to the winding Z(2P). P power supply terminals are correspondence with the P AC-DC conversion units in one-to-one ratio, each of the power supply terminals is electrically connected to the output of the corresponding AC-DC conversion unit. As shown in FIG. 11A, the AC-DC conversion 1 is corresponding to the power supply terminal D1. Specifically, the output of the AC-DC conversion unit 1 is electrically connected to the power supply terminal D1 or directly forms the power supply terminal D1. And the AC-DC conversion unit P is corresponding to the power supply terminal DP. Specifically, the output of the AC-DC conversion unit P is electrically connected to the power supply terminal DP or directly forms the power supply terminal DP.

A phase shifting angle between the first winding and the second winding in the same winding pairs is 30°. For example, the phase shifting angle between the winding Z1 and the winding Z2 is 30°. A phase shifting angle between the first windings in adjacent winding pairs is 360°/12P, and a phase shifting angle between the second windings in adjacent winding pairs is 360°/12P. That is, in the power supply device, the phase shifting angle between the winding Z1 and the winding Z(i+2) is 360°/12P. Assuming the P is 2, the phase shifting angle between the winding Z1 and the winding Z2 is 30°, the phase shifting angle between the winding Z1 and the winding Z3 is 15°, the phase shifting angle between the winding Z3 and the winding Z4 is 30°, and the phase shifting angle between the winding Z2 and the winding Z4 is 15°.

The power supply device as shown in FIG. 11A, when the P power supply terminals are electrically connected to the equipment charged at the same time, a 12P pulse wave rectification charge is implemented. It can be understood as that the power supply device forms a charge structure with the 12P pulse wave rectification, when P power supply terminals are all in working state.

Figure 11B:
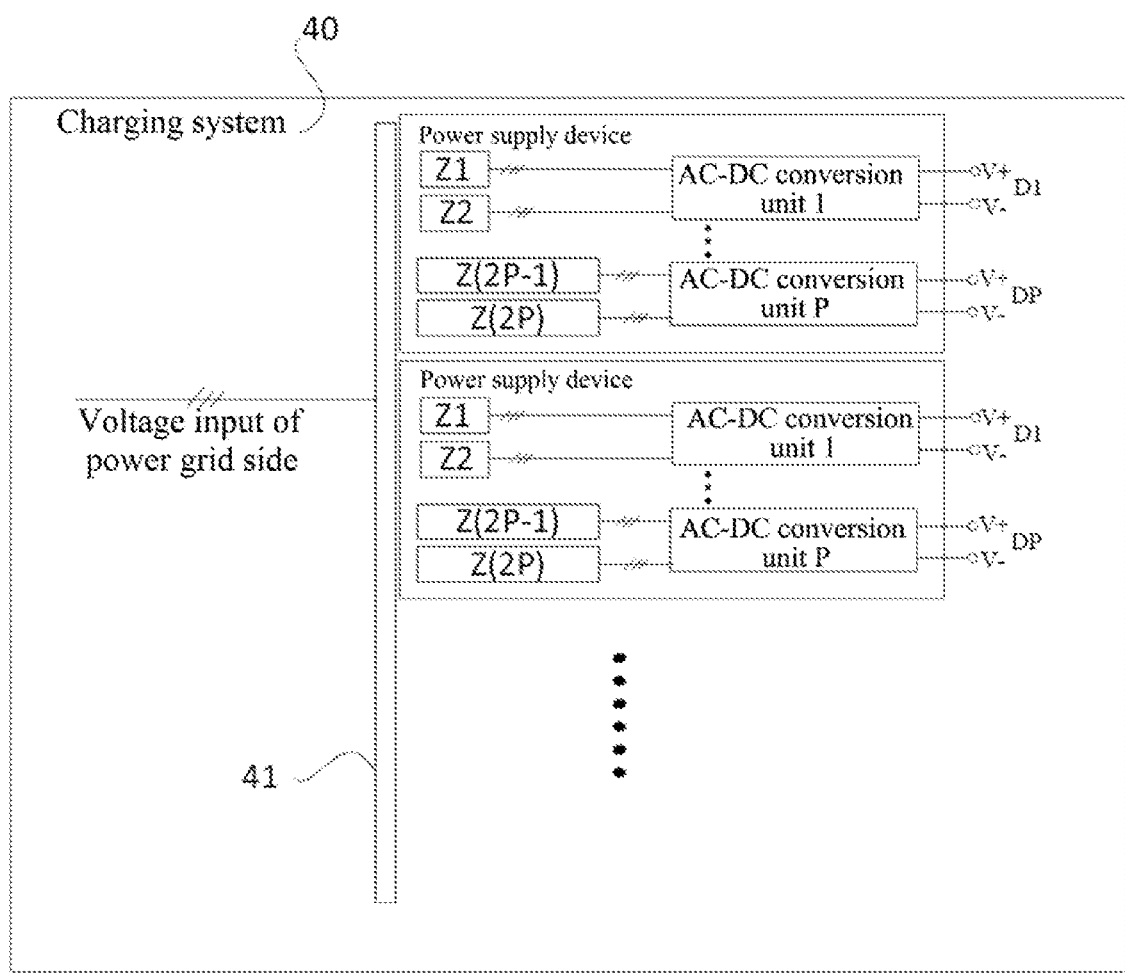
FIG. 11B is a schematic structural diagram of another charging system provided in an embodiment of the present application.

Refer to FIG. 11B, which is a schematic structural diagram of a charging system according to an embodiment of the present application. The charging system 40 shown in FIG. 11B includes: the multi-pulse transformer 41 and M power supply devices shown in FIG. 11A. M is a positive integer, and preferably, the number of the power supply devices M is large than or equal to two.

The multi-pulse transformer 41, coupled to the power grid via the primary-side winding, is configured to obtain the voltage of the power grid. And the secondary side of the multi-pulse transformer 41 includes winding pairs of the M power supply devices. That is to say, M*P winding pairs of the M power supply devices are set on the secondary side of the multi-pulse transformer 41.

In the present embodiments, the charging system 40 can provide M*P power supply terminals, and satisfy charge demands of M*P equipment charged. Further, the charging system 40 include the charge scheduling device (which is not shown in the figure), and the charge scheduling device is configured to schedule the power supply terminals and arrange the power supply terminals flexibly according to the total amount of the equipment charged and the number of pulse waves of the multi-pulse transformer 12P. The charge scheduling device schedules the power supply terminals to work or keep idle, so that a multi-pulse rectification charging system is formed and current ripple and harmonic waves in the system are reduced.

In an embodiment, the total amount of the equipment charged which is detected by the charge scheduling device is n*P. That is to say the total amount of the equipment charged is an integer multiple of the number of the power supply terminals owned by one power supply device, and there are redundant power supply terminals in the system. The charge scheduling device is configured to arrange the power supply terminals of n power supply devices from the M power supply devices to charge the n*P equipment charged. n is a positive integer and n≤M. The n power supply devices form the 12p pulse wave rectification charging system, thereby reducing the harmonic waves of the system. When the amount of the equipment charged is less than M*P, one part of the power supply terminals are in working state, and the other part of the power supply terminals are in idle state. And the power supply terminals in working state all belong to the n power supply devices.

In another embodiment, the total amount of the equipment charged which is detected by the charge scheduling device is n*P+j. That is, the total amount of the equipment charged is an integer multiple of the number of the power supply terminals owned by single power supply device plus a number less than the number of the power supply terminals owned by single power supply device, and there are redundant power supply terminals in the system. The charge scheduling device arranges the power supply terminals of n power supply devices from the M power supply devices to charge the n*P equipment charged, and j power supply terminals of any one of the power supply devices from remained M-n power supply devices to charge the remained j equipment charged. n and j are positive integers, and n<M and j<P. The 12p pulse wave rectification charge can be kept to the maximum extent in the charging system, thereby achieving the minimum harmonic wave.

In above-described embodiment, when P is an even integer lager than two and j is an even integer, a twenty-four pulse wave rectification charge can also be implemented by scheduling the power supply terminals. Schedule any power supply device from the remained M-n power supply devices, and in this power supply device, the P power supply terminals are divided into P/2 groups. Each group includes a k'-th power supply terminal and a k'+P/2-th power supply terminal, k'=1 . . . P/2. The charge scheduling device selects j/2 groups of power supply terminals from this power supply device to supply power to the remaining j equipment charged. Finally, the n power supply devices form the 12p pulse wave rectification charging structure, and the power supply device charging the remained j equipment charged forms the twenty-four pulse wave rectification charging structure, thereby achieving an optimized harmonic wave of the system.

In another embodiment, the total amount of the equipment charged which is detected by the charge scheduling device is 2n. P power supply terminals of each power supply device are divided into P/2 groups, and each group includes the k'-th power supply terminal and the k'+P/2-th power supply terminal. k'=1 . . . P/2, and P is an even integer. The charge scheduling device is configured to arrange n power supply devices from the M power supply devices and choose one group of power supply terminals from each of the n power supply devices to charge the 2n equipment charged. n is a positive integer and n≤M.

Figure 12:
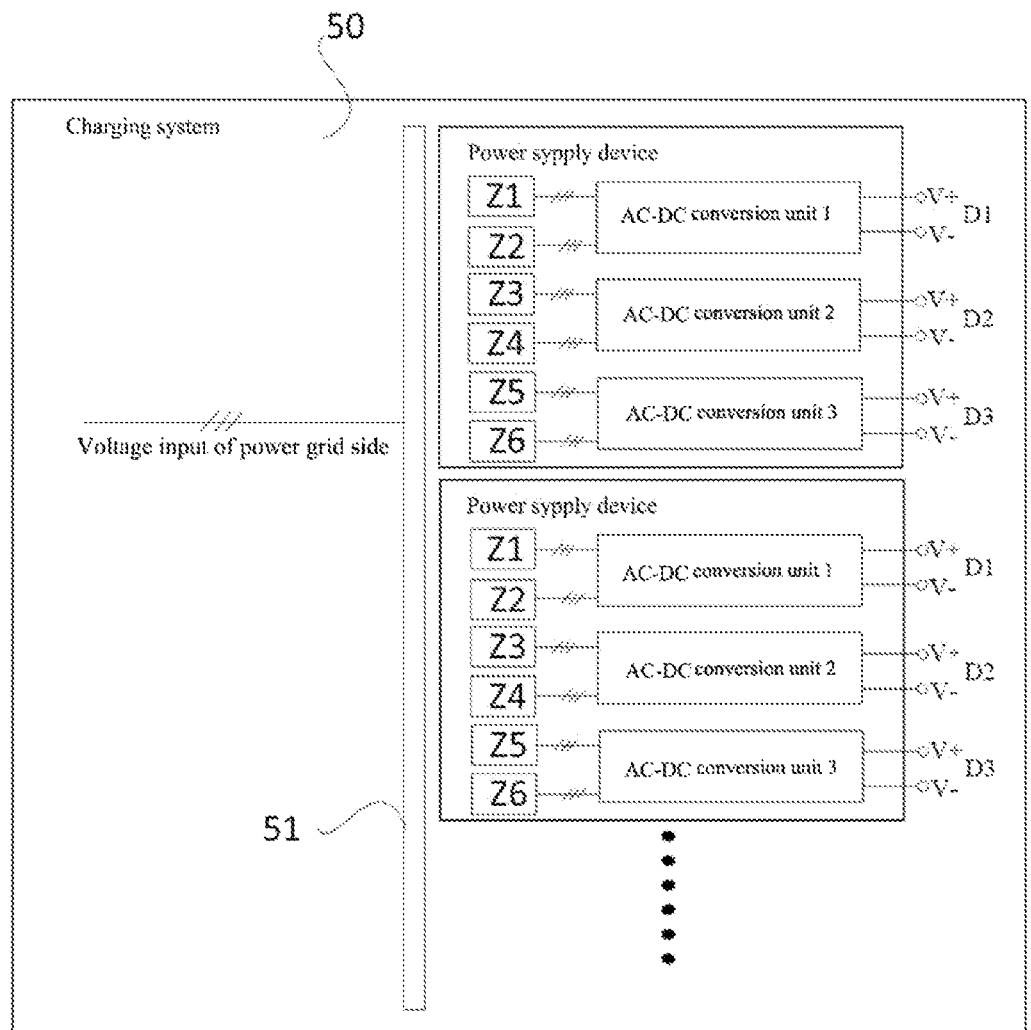
FIG. 12 is a schematic structural diagram of another charging system provided in an embodiment of the present application.

Refer to FIG. 12, which is a schematic structural diagram of the charging system according to another embodiment of the present application. As shown in FIG. 12, the charging system 50 includes the multi-pulse transformer 51 and M power supply devices. Each power supply device includes three winding pairs, and each winding pairs include the first winding and the second winding. The three winding pairs are successively a first winding pairs, a second winding pairs and a third winding pairs from top to bottom. The first winding pairs include the first winding Z1 and the second winding Z2, the second winding pairs include the first winding Z3 and the second winding Z4, and the third winding pairs include the first winding Z5 and the second winding Z6. The three AC-DC conversion units are successively AC-DC conversion unit 1, AC-DC conversion unit 2 and AC-DC conversion unit 3 from top to bottom. Three winding pairs are respectively coupled to three AC-DC conversion units in one-to-one ratio. The first input of the AC-DC conversion unit 1 is electrically connected to the winding Z1, and the second input thereof is electrically connected to the winding Z2; the first input of the AC-DC conversion unit 2 is electrically connected to the winding Z3, and the second input thereof is electrically connected to the winding Z4; and the first input of the AC-DC conversion unit 3 is electrically connected to the winding Z5, and the second input thereof is electrically connected to the winding Z6. Three power supply terminals correspond with the three AC-DC conversion units in one-to-one ratio, and each power supply terminal is electrically connected to the output of corresponding AC-DC conversion unit. As shown in FIG. 12, the output of the AC-DC conversion unit 1 is electrically connected to the power supply terminal D1 or directly forms the power supply terminal D1; the output of the AC-DC conversion unit 2 is electrically connected to the power supply terminal D2 or directly forms the power supply terminal D2; and the output of the AC-DC conversion unit 3 is electrically connected to the power supply terminal D3 or directly forms the power supply terminal D3.

In the first winding pairs, the phase shifting angle between the first winding Z1 and the second winding Z2 is 30°. In the second winding pairs, the phase shifting angle between the first winding Z3 and the second winding Z4 is 30°. The phase shifting angle between the first winding Z1 of the first winding pairs and the first winding Z3 of the second winding pairs is 10°, and the phase shifting angle between the second winding Z2 of the first winding pairs and the second winding Z4 of the second winding pairs is 10°. In the third winding pairs, the phase shifting angle between the first winding Z5 and the second winding Z6 is 30°, the phase shifting angle between the first winding Z3 of the second winding pairs and the first winding Z5 of the third winding pairs is 10°, and the phase shifting angle between the second winding Z4 of the second winding pairs and the second winding Z6 of the third winding pairs is 10°. That is, the windings Z1, Z3 and Z5 are successively shifted left (or right) for 10°, and the windings Z2, Z4 and Z6 are successively shifted left (or right) for 10°.

In the present embodiment, the charging system 50 can provide 3M power supply terminals, which can satisfy charge demands of 3M equipment charged. Furthermore, the charging system 50 also includes a charge scheduling device (which is not shown in the figure), and the charge scheduling device is configured to schedule the power supply terminals and arrange the power supply terminals flexibly according to the total amount of the equipment charged and the number of pulse waves of the multi-pulse transformer 36.

In the present embodiment, when detecting the total amount of the equipment charged is 3n, the charge scheduling device is configured to schedule the power supply terminals (D1, D2 and D3) of n power supply devices from M power supply devices to charge the 3n equipment charged. n is a positive integer and n≤M. The n power supply devices form 36 pulse-wave rectification charging system, thereby reducing the harmonic wave of the system. When the number of the electrical automobiles to be charged is a multiple of three, thirty-six pulse wave rectification charge station is formed by equally distributing the power supply terminals D1, D2 and D3.

In the present embodiment, when the total amount of the equipment charged which is detected by the charge scheduling device is 3n+j, the charge scheduling device is configured to schedule the power supply terminals of n power supply devices from M power supply devices to charge the 3n equipment charged, and j power supply terminals of any one of the power supply devices from remained M-n power supply devices to charge the remained j equipment charged. n and j are positive integers, and n<M and j<3. The 36 pulse rectification charge can be kept to the maximum extent in the charging system, thereby achieving the minimum harmonic wave. When there are 3n+1 or 3n+2 electrical automobiles need to be charged, the harmonic wave can also be controlled to the minimize by ensuring the numbers of the automobiles assigned to the power supply terminals D1, D2 and D3 differ by one or zero. For example, when there are 10 automobiles charged, 3 power supply terminals D1 are scheduled to charge 3 automobiles; 3 power supply terminals D2 are scheduled to charge 3 automobiles; 4 power supply terminals D3 are scheduled to charge 3 automobiles; when there are 11 automobiles charged, 3 power supply terminals D1 are scheduled to charge 3 automobiles; 4 power supply terminals D2 are scheduled to charge 3 automobiles; 4 power supply terminals D3 are scheduled to charge 3 automobiles.

Figure 13:
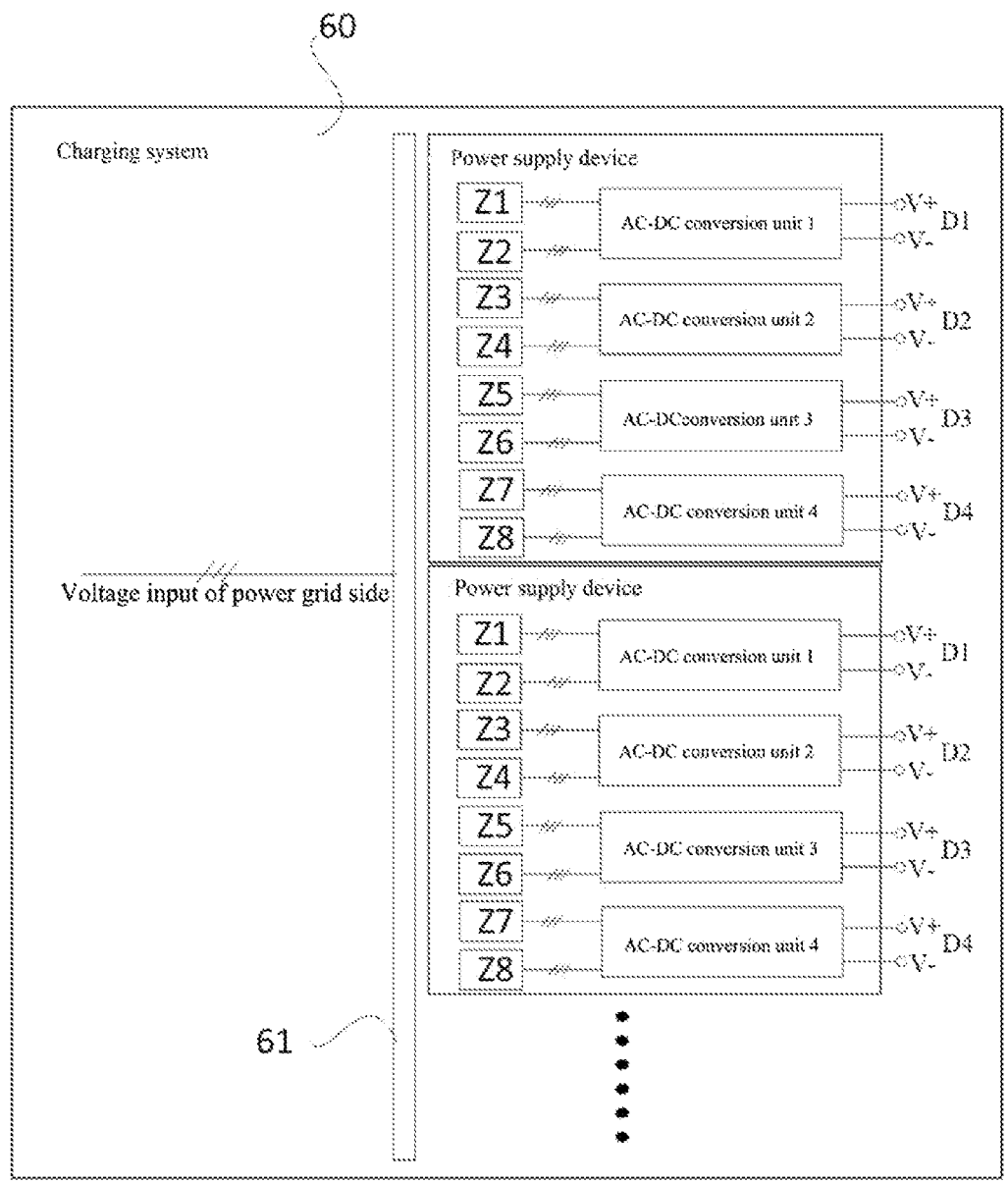
FIG. 13 is a schematic structural diagram of another charging system provided in an embodiment of the present application.

Refer to FIG. 13, which is a schematic structural diagram of the charging system according to one embodiment of the present application. The charging system 60 includes the multi-pulse transformer 61 and M power supply devices. Each power supply device includes four winding pairs, four AC-DC conversion units and four power supply terminals. The structure of the charging system 60 is similar to that of the charging system 50, the similar part wouldn't be repeated, and merely the difference between them will be described. The phase shifting angle between the first winding and the second winding in the same winding pairs is 30°, the phase shifting angle between the first windings in adjacent winding pairs is 7.5°, and the phase shifting angle between the second windings in adjacent winding pairs is 7.5°. That is, the windings Z1, Z3, Z5 and Z7 are successively shifted left (or right) for 7.5°, and the windings Z2, Z4, Z6 and Z8 are successively shifted left (or right) for 7.5°. In the present embodiment, the charging system 60 can provide 4M power supply terminals which satisfy charge demands of 4M equipment charged.

In the present embodiment, when the charge scheduling device detects that the total amount of the equipment charged is 4n, the charge scheduling device is configured to schedule the power supply terminals (D1, D2, D3 and D4) of n power supply devices from M power supply devices to charge the 4n equipment charged. The n power supply devices form 48 pulse-wave rectification charging system, thereby reducing the harmonic wave of the system. When the number of the electrical automobiles need to be charged is a multiple of four, the forty-eight pulse-wave rectification charge structure is formed by equally distributing any one of the power supply terminals D1, D2, D3 and D4.

In the present embodiment, when the charge scheduling device detects that the total amount of the equipment charged is 4n+j, the charge scheduling device is configured to schedule the power supply terminals of n power supply devices from M power supply devices to charge the 4n equipment charged, and j power supply terminals of any one of the power supply devices from remained M-n power supply devices to charge the remained j equipment charged; j<4. The 48 pulse-wave rectification charge can be kept to the maximum extent in the charging system, thereby achieving the minimum harmonic wave. When the number of electrical automobiles need to be charged is not the multiple of four, the harmonic wave can also be controlled to the minimize by ensuring the numbers of the automobiles assigned to power supply terminals D1, D2, D3 and D4 differ by one or zero.

When the total amount of the equipment charged which is detected by the charge scheduling device is 4n+2, that is, j is equal to two. The charge scheduling device schedules any one of the power supply devices from the remained M-n power supply devices. Four power supply terminals of the power supply device are divided into two groups, one group includes power supply terminals D1 and D3, and the other group includes power supply terminals D2 and D4. Then power supply terminals D1 and D3 or power supply terminals D2 and D4 is selected to charge the remained two equipment charged. The power supply terminals D1 and D3 charging the remained two equipment charged is taken as an example, D1 is corresponding to the windings Z1 and Z2, and D3 is corresponding to the windings Z5 and Z6. The phase shifting angles between Z1 and Z5 is 15° and the phase shifting angle between Z2 and Z6 is 15°. Phases of output voltages of the windings Z1, Z5, Z2, Z6 are successively shifted left or successively shifted right for 15°, and the windings Z1, Z2, Z5, Z6 supply power for the corresponding AC-DC conversion units at the same time, which meets the conditions of forming the 24 pulse wave rectification. Therefore, n power supply devices for charging 4n equipment charged form the 48 pulse-wave rectification charging structure, and meanwhile the power supply device for charging the remained two equipment charged form the 24 pulse-wave rectification charging structure, thereby achieving an optimization of the harmonic wave.

In the present embodiment, if the total amount of the equipment charged which is detected by the charge scheduling device is 2n, four power supply terminals of each power supply device are divided into two groups, one group includes power supply terminals D1 and D3, and the other group includes power supply terminals D2 and D4. The charge scheduling device is configured to schedule n power supply devices from the M power supply devices and choose one group of power supply terminals (such as power supply terminals D1 and D3 or power supply terminals D2 and D4) of each power supply device to charge the 2n equipment charged. When the number of the electrical automobiles charged is a multiple of two, ensuring that the electrical automobiles are equally distributed to power supply terminals D1 and D3, the 24 pulse wave rectification charge structure can be formed then. Of course, the electrical automobiles can also be equally distributed to power supply terminals D2 and D4 to form the 24 pulse-wave rectification charge structure.

Figure 14:
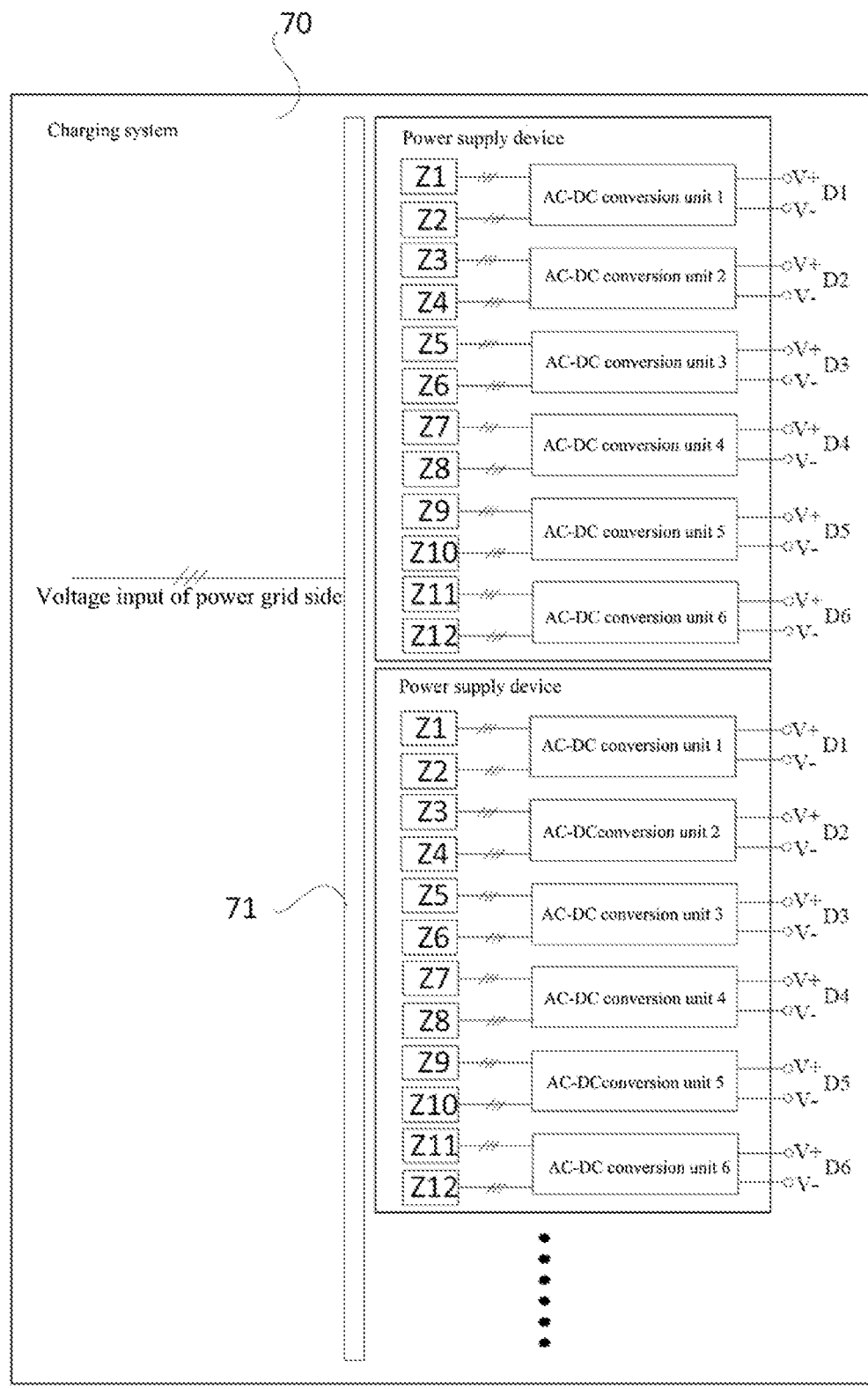
FIG. 14 is a schematic structural diagram of another charging system provided in an embodiment of the present application.

Refer to FIG. 14, which is a schematic structural diagram of the charging system according to other embodiment of the present application. The charging system 70 includes the multi-pulse transformer 71 and M power supply devices. Each power supply device includes six winding pairs, six AC-DC conversion units and six power supply terminals. The structure of the charging system 70 is similar to that of the charging system 50, the similar part would not be repeated, and merely the difference between them would be described. The phase shifting angle between the first winding and the second winding in the same winding pairs is 30°, the phase shifting angle between the first windings in adjacent winding pairs is 5°, and the phase shifting angle between the second windings in adjacent winding pairs is 5°. That is, the windings Z1, Z3, Z5, Z7, Z9 and Z11 are successively shifted left (or right) for 5°, and the windings Z2, Z4, Z6, Z8, Z10 and Z12 are successively shifted left (or right) for 5°. In the present embodiment, the charging system 70 can provide 6M power supply terminals, thereby satisfying charge demands of 6M equipment charged.

In the present embodiment, when the charge scheduling device detects that the total amount of the equipment charged is 6n, the charge scheduling device is configured to schedule the power supply terminals (D1, D2, D3, D4, D5 and D6) of n power supply devices from M power supply devices to charge the 6n equipment charged. The n power supply devices form 72 pulse-wave rectification charging system, thereby reducing the harmonic wave of the system. When the number of the electrical automobiles charged is a multiple of 6, 72 pulse-wave rectification charge structure is formed by equally distributing any one of the power supply terminals D1, D2, D3, D4, D5 and D6.

In the present embodiment, when the charge scheduling device detects that the total amount of the equipment charged is 6n+j, the charge scheduling device is configured to schedule the power supply terminals of n power supply devices from M power supply devices to charge the 6n equipment charged, and j power supply terminals of any one of the power supply devices from remained M-n power supply devices to charge the remained j equipment charged; j<6. The 72 pulse-wave rectification charge can be kept to the maximum extent in the charging system, thereby achieving minimum the harmonic wave. When the number of electrical automobiles charged is not the multiple of six, the harmonic wave can also be controlled to the minimize by ensuring the numbers of the automobiles assigned to power supply terminals D1, D2, D3, D4, D5, and D6 differ by one or zero.

When the total amount of the equipment charged which is detected by the charge scheduling device is 6n+2 or 6n+4, that is, j is equal to two or four. The charge scheduling device schedules any one of the power supply devices from the remained M-n power supply devices. Six power supply terminals of the power supply device are divided into three groups, one of the groups includes power supply terminals D1 and D4, one of the groups includes power supply terminals D2 and D5, and another group includes power supply terminals D3 and D6. When the amount of the equipment charged is 6n+2, one group of the power supply terminals is selected to charge the remained two equipment charged; when the amount of the equipment charged is 6n+4, two groups of the power supply terminals are selected to charge the remained four equipment charged. The power supply terminals D1 and D4 charging the remained two equipment charged is taken as an example, D1 is corresponding to the windings Z1 and Z2, D4 is corresponding to the windings Z7 and Z8. The phase shifting angle between Z1 and Z7 is 15° and the phase shifting angle between Z2 and Z8 is 15°. Phases of output voltages of the windings Z1, Z7, Z2, Z8 are successively shifted left or successively shifted right for 15°, and the windings Z1, Z2, Z7, Z8 supply power for the corresponding AC-DC conversion units at the same time, which meets the conditions of forming the 24 pulse-wave rectification. Therefore, n power supply devices for charging the 6n equipment charged form the 24 pulse-wave rectification charging structure, and meanwhile the power supply device for charging the remained j equipment charged form the 24 pulse-wave rectification charging structure, thereby achieving an optimization of the harmonic wave.

In the present embodiment, when the charge scheduling device detects that the total amount of the equipment charged is 2n, six power supply terminals of each power supply device are divided into three groups, one of the groups includes power supply terminals D1 and D4, one of the groups includes power supply terminals D2 and D5, and another group includes power supply terminals D3 and D6. The charge scheduling device is configured to schedule n power supply devices from the M power supply devices and choose one group of power supply terminals (such as power supply terminals D1 and D4, power supply terminals D2 and D5, or power supply terminals D3 and D6) of each power supply device to charge the 2n equipment charged. When the number of the electrical automobiles charged is a multiple of two, the electrical automobiles are equally distributed to power supply terminals D1 and D4, the electrical automobiles are equally distributed to power supply terminals D2 and D5, or the electrical automobiles are equally distributed to power supply terminals D3 and D6, so that the 24 pulse wave rectification charge can be formed then.

In one embodiment, each of the AC-DC conversion units includes the first rectifier and the second rectifier, the first rectifier has the first input, the second rectifier has the second input, and the output of the first rectifier and the output of the second rectifier are connected in series or parallel.

In another embodiment, the AC-DC conversion unit includes the first rectifier, the second rectifier and the DC-DC converter. The first rectifier has the first input, the second rectifier has the second input, and the output of the first rectifier and the output of the second rectifier are connected in series or parallel and then coupled to an input of the DC-DC converter. In this embodiment, the AC-DC conversion unit is similar to that in FIG. 2 and FIG. 3, so the related explanation can be referred to.

In other embodiment, each of the AC-DC conversion units includes the first rectifier and the first DC-DC converter, and the second rectifier and the second DC-DC converter. The first rectifier has the first input, and the output of the first rectifier is connected to the input of the first DC-DC converter. The second rectifier has the second input, and the output of the second rectifier is connected to the input of the second DC-DC converter. And the output of the first DC-DC converter and the output of the second DC-DC converter are connected in series or parallel to form the output of the AC-DC conversion unit. In this embodiment, the AC-DC conversion unit is similar to that in FIG. 4D, so the related explanation can be referred to.

The above-described scheduling of the charge scheduling device, can be the scheduling of idle power supply terminals or reassigning the working states of all of the power supply terminals, when the total amount of the equipment charged is changed. The changing of the total amount of the equipment charged can be that either new charge devices have been connected to charging, or charge devices that were originally charging have been disconnected from charging. It should be illustrated that the total amount of the equipment charged includes the amount of the original equipment charged and the amount of the equipment charged to be connected; or the amount of the equipment charged merely includes the amount of the equipment charged to be connected, which can be flexible switched according to the actual case.

Figure 15:
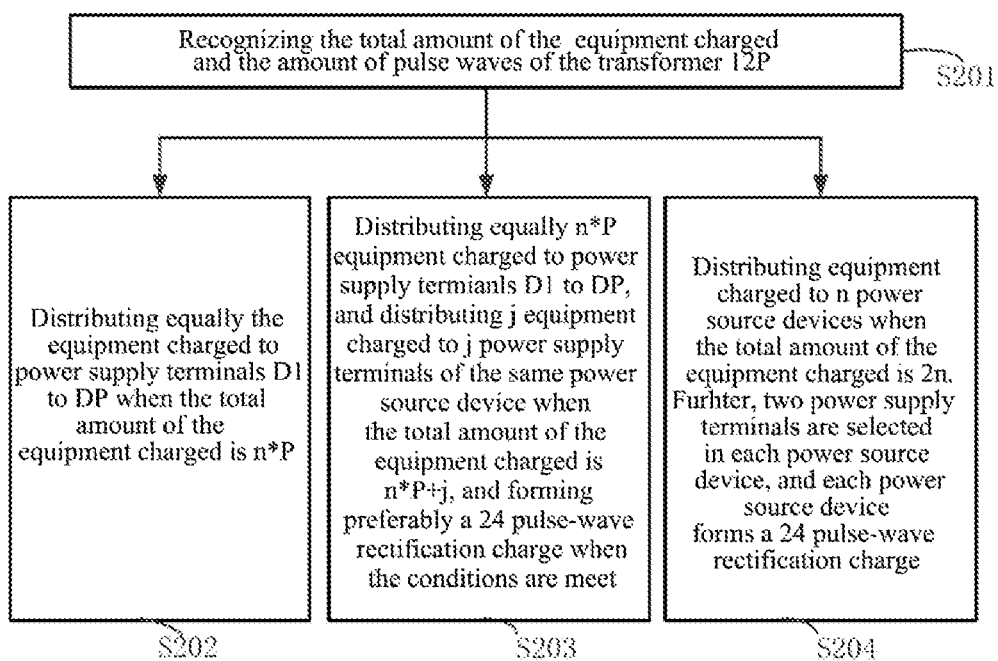
FIG. 15 is a flowchart of another charge scheduling method provided in an embodiment of the present application.

Based on the charging system as shown in FIGS. 11A-14, refer to FIG. 15, which is a flowchart of the charge scheduling method according to another embodiment of the present application. The executive subject of the method as shown in FIG. 15 can be software and/or hardware, for example, the charge scheduling device of the charge station or the online appointment charge scheduling system. The charge scheduling method includes steps S201 to S204, which is specifically as below:

S201, recognizing the total amount of the equipment charged and the amount of pulse waves of the transformer 12P.

S202, distributing equally the equipment charged to power supply terminals D1 to DP when the total amount of the equipment charged is n*P.

S203, distributing equally n*P equipment charged to power supply terminals D1 to DP, and j equipment charged to j power supply terminals of the same power supply device when the total amount of the equipment charged is n*P+j, and forming preferably a 24 pulse wave rectification charge when the conditions are meet.

S204, distributing equipment charged to n power supply devices when the total amount of the equipment charged is 2n. Further, two power supply terminals are selected in each power supply device, and each power supply device forms a 24 pulse wave rectification charge.

The structures of the charge scheduling device of the charging system as shown in FIG. 11A, FIG. 11B, FIG. 12, FIG. 13 and FIG. 14 are similar to that as shown in FIG. 9, which would not be repeated herein.

An embodiment of the present application also provide a readable storage medium, the readable storage medium has the computer program stored therein, and the computer program is executed by a processor to implement the charge scheduling method provided in the above-described various implementations.

The readable storage medium can be a computer storage medium, or a communication medium. The communication medium includes any medium convenient for transmitting computer program from a place to another place. The computer storage medium can be any usable medium that can be accessed by computer in general purpose or special purpose. For example, the readable storage medium is coupled to a processor to make the processor capable of reading information from the readable storage medium, and writing information into the readable storage medium. Certainly, the readable storage medium can also be a constituent part of the processor. The processor and the readable storage medium can be located in application specific integrated circuits (which is shorten to ASIC). In addition, the ASIC can be located in user equipment. Certainly, the processor and the readable storage medium can also exist in communication equipment as a discrete component. The readable storage medium can merely be a read-only memory (ROM), a random-access memory (RAM), a CD-ROM, a magnetic tape, a floppy disk, and an optical data storage device and the like.

The present application also provides a program product, the program product includes an executive instruction, and the executive instruction is stored in the readable storage medium. At least one of the processors of the equipment can read the executive instruction from the readable storage medium, and at least one of the processors execute the executive instruction to make the equipment implement the charge scheduling method provided in above-described various implementations.

In above-described embodiments of charge scheduling device, it should be understood that the processor can be a central processing unit (which is shorten to CPU), and can also be other general processor, digital signal processor (which is shorten to DSP), application specific integrated circuits (which is shorten to ASIC) and the like. General processor can be a microprocessor or the processor can also be any common processor. In combination with the steps of the method disclosed in the present application, it can be directly embodied as being achieved via an execution of a hardware processor, or being achieved via an execution of a combination of hardware and software module of the processor.

Finally, it should be illustrated that the above-described embodiments are merely illustrative of the technical solution of the present application, but should not be construed as limiting the present application. Although the present application is illustrated in detail with reference to the foregoing various embodiments, those skilled in the art should understand that, modifications can still be made to the technical solution recorded in the foregoing various embodiments, or equivalent replacements can still be made to part or all of the technical features therein; while these modifications or replacements doesn't make essentials of the corresponding technical solution depart from the scope of the technical solution of the various embodiments of the present application.

What is claimed is:

1. A power supply device, comprising: a first winding, a second winding, a third winding, a fourth winding, a first alternating current-direct current (AC-DC) conversion unit, a second AC-DC conversion unit, a first power supply terminal and a second power supply terminal;
   the first winding and the second winding disposed on a secondary side of a multi-pulse transformer, and coupled to an input of the first AC-DC conversion unit;
   the first power supply terminal coupled to an output of the first AC-DC conversion unit;
   the third winding and the fourth winding disposed on the secondary side of the multi-pulse transformer, and coupled to an input of the second AC-DC conversion unit; and
   the second power supply terminal coupled to an output of the second AC-DC conversion unit;
   wherein phases of output voltages of the first winding, the third winding, the second winding and the fourth winding are successively increased or decreased by 15°;
   wherein the first winding and the second winding forms a first winding pair, the third winding and the fourth winding forms a second winding pair, the first winding pair corresponds to the first AC-DC conversion unit, the second winding pair corresponds to the second AC-DC conversion unit, and each of the first winding pair and the second winding pair is in a one-to-one correspondence with a corresponding one of the first AC-DC conversion unit and the second AC-DC conversion unit.

2. The power supply device according to claim 1, wherein the first winding is a star winding; the second winding is a delta winding; the third winding is an epitaxy delta winding decreased by 15° relative to the second winding and the fourth winding is an epitaxy delta winding increased by 15° relative to the second winding.

3. The power supply device according to claim 1, wherein the first AC-DC conversion unit comprises a first rectifier and a second rectifier;
   an input of the first rectifier is coupled to the first winding;
   an input of the second rectifier is coupled to the second winding; and an output of the first rectifier and an output of the second rectifier are coupled in series or parallel to form a first port;

wherein the first port is coupled to the first power supply terminal, or the first port is coupled to the first power supply terminal through a first direct current-direct current (DC-DC) converter.

4. The power source device according to claim 1, wherein the second AC-DC conversion unit comprises a third rectifier and a fourth rectifier;

an input of the third rectifier is coupled to the third winding;

an input of the fourth rectifier is coupled to the fourth winding; and an output of the third rectifier and an output of the fourth rectifier are coupled in series or parallel to form a second port;

wherein the second port is coupled to the second power supply terminal, or the second port is coupled to the second power supply terminal through a second DC-DC converter.

5. The power supply device according to claim 1, further comprising: a power supply switching unit;

wherein the power supply switching unit comprises a first switch component, a second switch component and a third switch component;

the first switch component is coupled between a negative pole of the first power supply terminal and a positive pole of the second power supply terminal;

the second switch component is coupled between a positive pole of the first power supply terminal and the positive pole of the second power supply terminal;

the third switch component is coupled between the negative pole of the first power supply terminal and a negative pole of the second power supply terminal;

wherein the second switch component is linked with the third switch component.

6. A charge scheduling method of a charging system, wherein the charging system includes a multi-pulse transformer and a plurality of the power source devices according to claim 1, a primary-side winding of the multi-pulse transformer is coupled to a power grid, and secondary-side windings of the multi-pulse transformer comprise the first winding, the second winding, the third winding and the fourth winding; the method comprising:

S1, obtaining the number of the first power supply terminals and the number of the second power supply terminals in working state when receiving a charge request of an equipment to be charged;

S2, scheduling a power supply terminal with a less number to charge the equipment to be charged, when the number of the first power supply terminals in working state is not equal to the number of the second power supply terminals in working state; and S3, scheduling one of the first power supply terminal and the second power supply terminal to charge the equipment to be charged, when the number of the first power supply terminals in working state is equal to the number of the second power supply terminals in working state.

7. The charge scheduling method according to claim 6, wherein the step of S3 comprises:

obtaining an estimated remaining charge time of each of the first power supply terminals in working state and an estimated remaining charge time of each of the second power supply terminals in working state;

scheduling a power supply terminal with less estimated remaining charge time to charge the equipment to be charged.

8. The charge scheduling method according to claim 6, wherein the charging system further comprises a charge scheduling device to execute the charge scheduling method, and the charge scheduling device comprises:

a request obtaining module, configured to obtain the number of the first power supply terminals in working state and the number of the second power supply terminals in working state, when receiving a charge request of an equipment to be charged;

a first processing module, configured to schedule a power supply terminal with a less number to charge the equipment to be charged, when the number of the first power supply terminals in working state is not equal to the number of the second power supply terminals in working state; and a second processing module, configured to schedule one of the first power supply terminal and the second power supply terminal to charge the equipment to be charged, when the number of the first power supply terminals in working state is equal to the number of the second power supply terminals in working state.

9. The charge scheduling method according to claim 8, wherein the second processing module is configured to obtain an estimated remaining charge time of each of the first power supply terminals in working state and an estimated remaining charge time of each of the second power supply terminals in working state; and schedule a power supply terminal with less estimated remaining charge time to charge the equipment to be charged.

10. A power supply device, comprising:

P winding pairs, each of the winding pairs consisting of a first winding and a second winding;

P AC-DC conversion units, each of the AC-DC conversion units comprising a first input, a second input and an output, wherein the first input is coupled to the first winding of a corresponding winding pair, and the second input is coupled to the second winding of the corresponding winding pair;

P power supply terminals, each of the power supply terminals coupled to the output of a corresponding AC-DC conversion unit;

wherein a phase shifting angle between the first winding and the second winding in each winding pair is 30°, a phase shifting angle between the first windings in adjacent winding pairs is 360°/12P, a phase shifting angle between the second windings in adjacent winding pairs is 360°/12P, and P is a positive integer larger than or equal to two;

wherein each of the winding pairs is in a one-to-one correspondence with a corresponding one of the AC-DC conversion units.

11. The power supply device according to claim 10, wherein each of the AC-DC conversion units comprises a first rectifier and a second rectifier, the first rectifier has the first input, the second rectifier has the second input, and an output of the first rectifier and an output of the second rectifier are coupled in series or parallel to form the output of the AC-DC conversion unit; or, each of the AC-DC conversion units comprises the first rectifier, the second rectifier and a first DC-DC converter, wherein the first rectifier has the first input, the second rectifier has the second input, the output of the first rectifier and the output of the second rectifier are coupled in series or parallel to an input of the first DC-DC converter; or, each of the AC-DC conversion units comprises the first rectifier and a first DC-DC converter, the second rectifier and a second DC-DC converter, wherein the first rectifier has the first input, the output of the first rectifier is coupled to an input of the first DC-DC converter, the second rectifier has the second input, the output of the second rectifier is coupled to an input of the second DC-DC converter, and an output of the first DC-DC converter and an output of the second DC-DC converter are coupled in series or parallel to form the output of the AC-DC conversion unit.

12. A charging system, comprising:

M power supply devices according to claim 10, wherein M is a positive integer; and a multi-pulse transformer, a primary-side winding of the multi-pulse transformer coupled to a power grid, and the winding pairs of the M power supply devices disposed on a secondary side of the multi-pulse transformer.

13. The charging system according to claim 12, further comprising:

a charge scheduling device, configured to schedule power supply terminals according to a total amount of equipment charged and the amount of pulse waves of the multi-pulse transformer.

14. The charging system according to claim 13, wherein the total amount of the equipment charged is n*P; and the charge scheduling device is configured to schedule the power supply terminals of n power supply devices from the M power supply devices, so as to charge the n*P equipment, wherein n is a positive integer and n≤M.

15. The charging system according to claim 13, wherein the total amount of the equipment charged is n*P+j; and the charge scheduling device is configured to schedule the power supply terminals of n power supply devices from the M power supply devices to charge n*P equipment charged, and j power supply terminals of one power supply device from remained M-n power supply devices to charge remained j equipment charged;

wherein n and j are positive integers, n<M, and j<P.

16. The charging system according to claim 15, wherein the charge scheduling device is configured to schedule j/2 groups of power supply terminals in the one power supply device to charge the remained j equipment charged, wherein the P power supply terminals of the one power supply device are divided into P/2 groups, each group comprises a k'-th power supply terminal and a k'+P/2-th power supply terminal, wherein k'=1 ... P/2, P is an even integer and larger than two, and j is an even integer.

17. The charging system according to claim 13, wherein the total amount of the equipment charged is 2n;

the P power supply terminals of each of the power supply devices are divided into P/2 groups, each group comprises the k'-th power supply terminal and the k'+P/2-th power supply terminal, wherein k'=1 ... P/2 and P is an even integer; and the charge scheduling device is configured to schedule n power supply devices from the M power supply devices and choose one group of each of the n power supply devices to charge the 2n equipment charged, wherein n is a positive integer and n≤M.

* * * * *